United States Patent [19]

Rosheim et al.

[11] Patent Number: 4,821,594
[45] Date of Patent: Apr. 18, 1989

[54] ROBOT JOINTS

[75] Inventors: Mark E. Rosheim, 1565 St. Paul Ave., St. Paul, Minn. 55116; Hans W. Trechsel, Rockford, Minn.

[73] Assignee: Mark E. Rosheim, St. Paul, Minn.

[21] Appl. No.: 205,443

[22] Filed: Jun. 10, 1988

[51] Int. Cl.[4] .............................................. G05G 11/00
[52] U.S. Cl. .......................................... 79/479; 902/28; 294/106
[58] Field of Search ...................... 74/479; 901/28, 29, 901/38; 294/106; 623/64, 65

[56] References Cited

U.S. PATENT DOCUMENTS

| 1,504,121 | 8/1924 | Harris . | |
|---|---|---|---|
| 3,202,449 | 8/1965 | Lemelson | 901/38 |
| 3,587,872 | 6/1971 | Pauly . | |
| 3,631,737 | 1/1972 | Wells . | |
| 3,694,021 | 9/1972 | Mullen . | |
| 3,739,923 | 6/1973 | Totsuka . | |
| 3,784,031 | 1/1974 | Niitu et al. . | |
| 4,068,536 | 1/1978 | Stackhouse . | |
| 4,073,201 | 2/1978 | Taylor et al. . | |
| 4,107,948 | 8/1978 | Molaug . | |
| 4,149,278 | 4/1979 | Frosch et al. | 901/29 |
| 4,194,437 | 3/1980 | Rosheim | 901/28 X |
| 4,216,701 | 8/1980 | Romoriya | 901/28 X |
| 4,246,661 | 1/1981 | Pinson . | |
| 4,296,681 | 10/1981 | Rosheim . | |
| 4,338,038 | 7/1982 | Cloarec | 901/28 X |
| 4,353,677 | 10/1982 | Susnjara et al. . | |
| 4,551,058 | 11/1985 | Mosher . | |
| 4,575,297 | 3/1986 | Richter . | |
| 4,628,765 | 12/1986 | Dien et al. . | |
| 4,686,866 | 8/1987 | Rosheim | 74/479 |
| 4,723,460 | 2/1988 | Rosheim | 901/28 X |
| 4,729,253 | 3/1988 | Rosheim | 74/479 |
| 4,739,241 | 4/1988 | Vachtseuanos | 901/28 X |
| 4,744,264 | 5/1988 | Milenkovic | 74/479 |

FOREIGN PATENT DOCUMENTS 2752236 7/1980 Fed. Rep. of Germany .
1114546 9/1984 U.S.S.R. .
1117203 10/1984 U.S.S.R. .

OTHER PUBLICATIONS

"Robot Wrist Actuators," M. Rosheim; *Robotics Age.*, Nov./Dec. 1982, pp. 15-22.
*Pictorial Handbook of Technical Devices*, P. Grafstein & O. Schwartz; Published by Chemical Publishing Co., Inc., New York, 1971, pp. 16-17.
"The Utah/MIT Dextrous Hand: Work in Progress," S. C. Jacobsen, J. E. Wood, D. F. Knutti, K. B. Biggers, *Robot Grippers*, pp. 341-389.

Primary Examiner—Peter A. Aschenbrenner
Attorney, Agent, or Firm—Kinney & Lange

[57] ABSTRACT

A robot joint having a ball-like arrangement on a support, the ball arrangement positioned in a socket device in which the ball is free to move so the socket device can rotate in various directions about the ball arrangement. First and second connectors connect force imparting arrangements to fixed points in the socket device. One of these force imparting arrangements is capable of approaching or receding from the other in some rotations of the socket device.

40 Claims, 18 Drawing Sheets

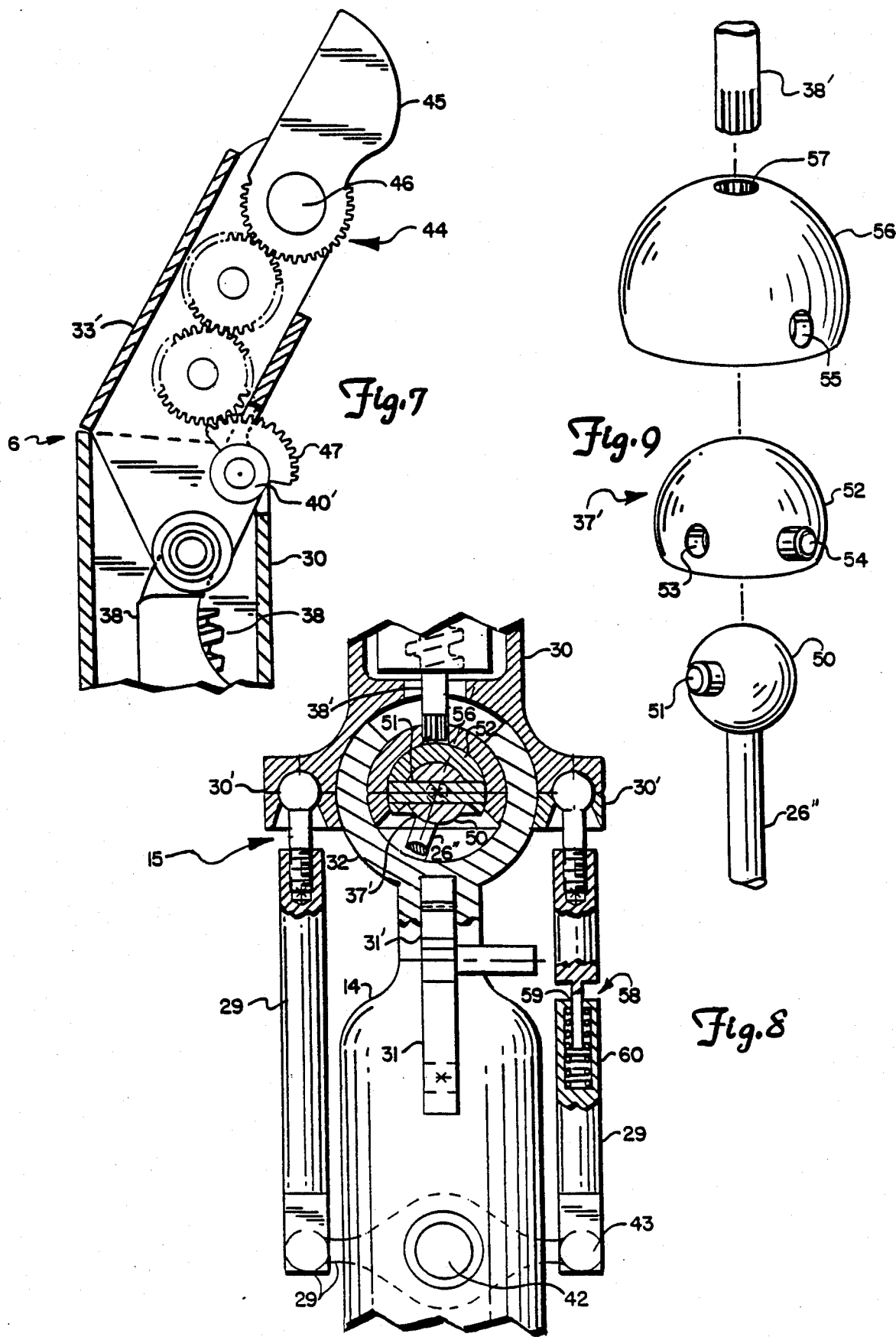

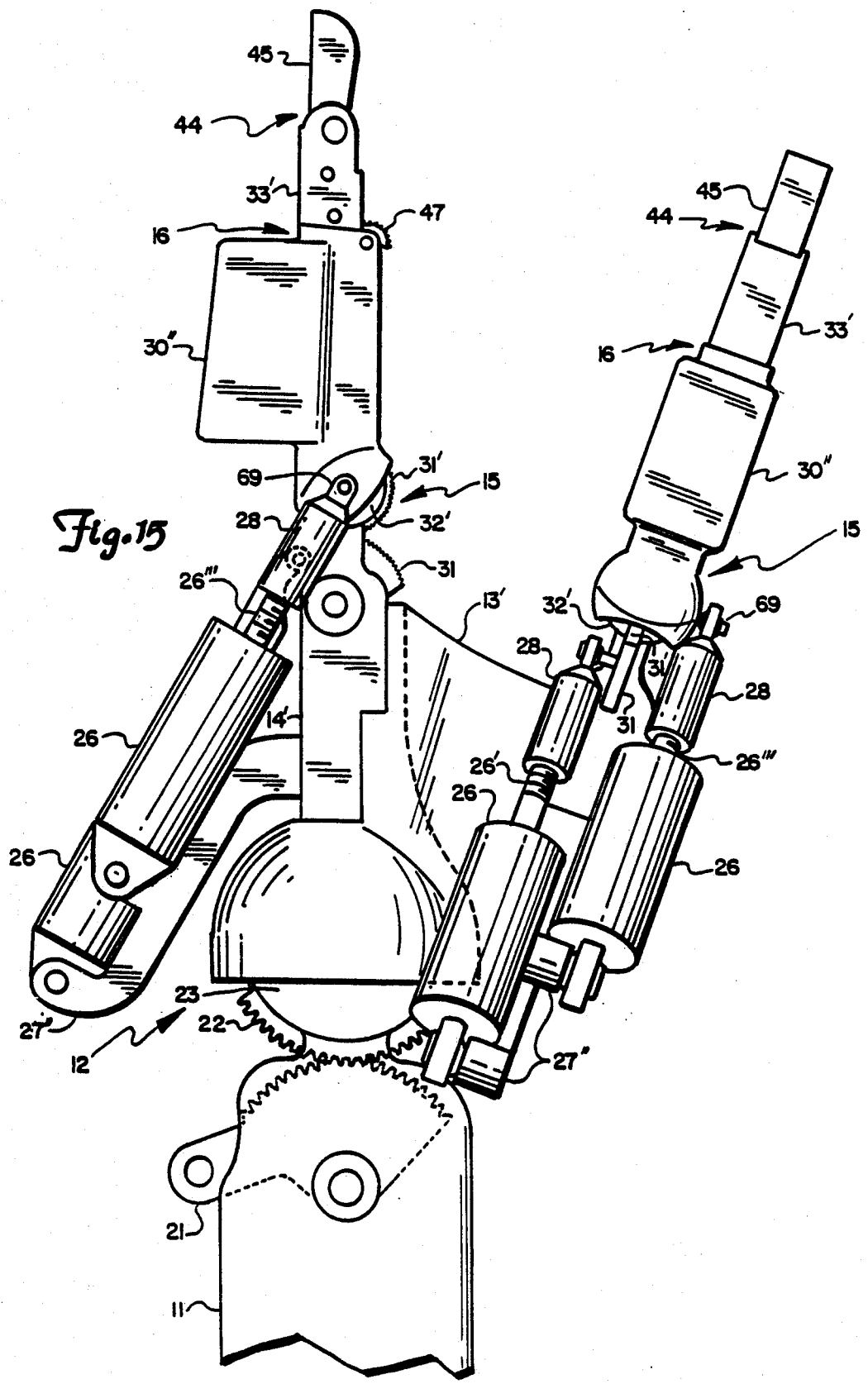

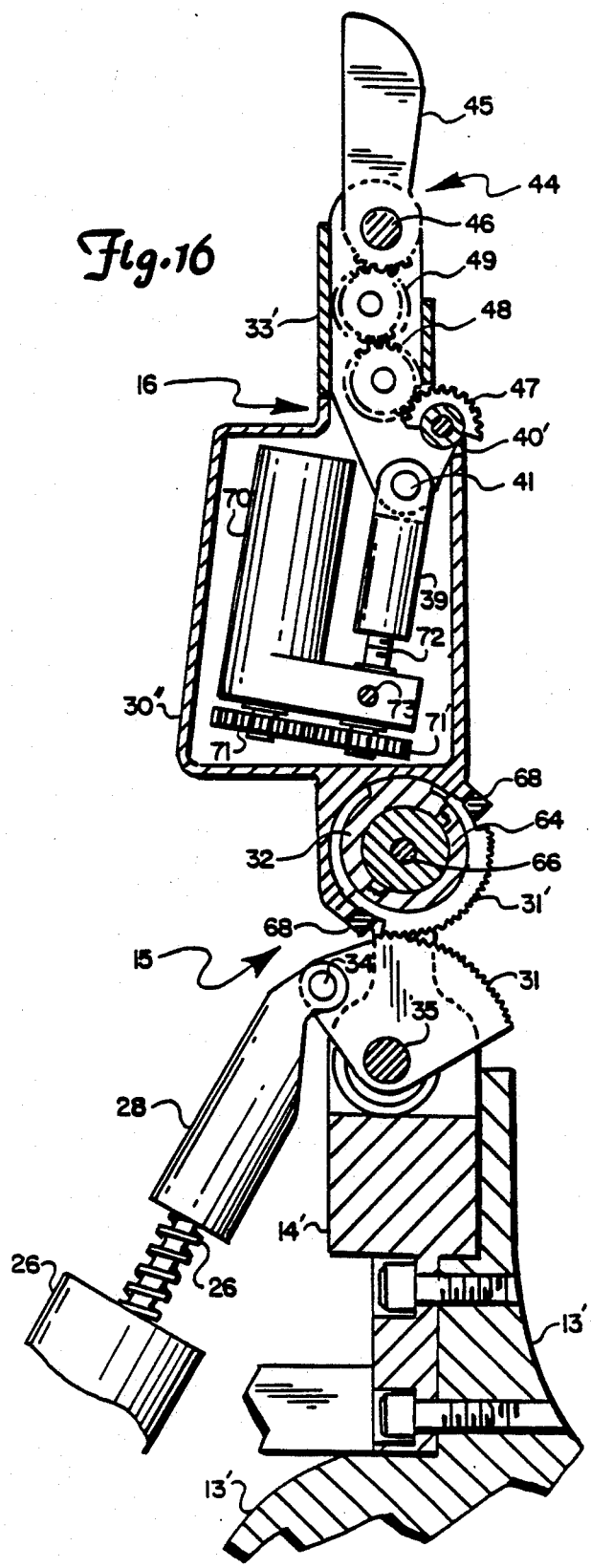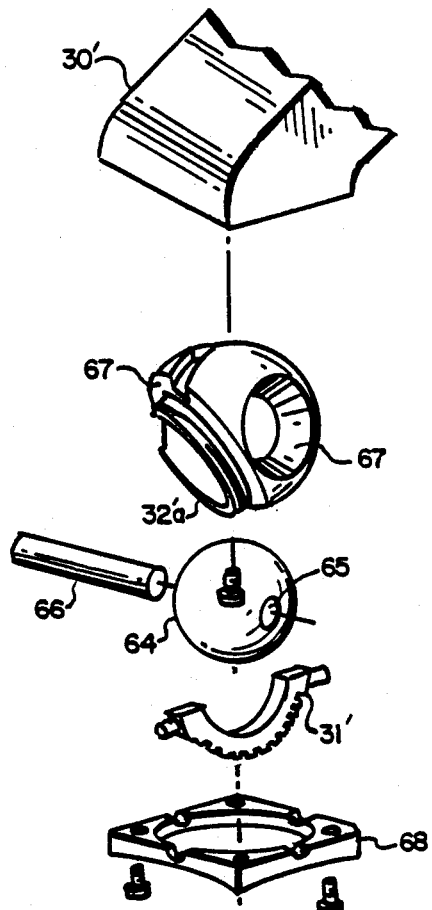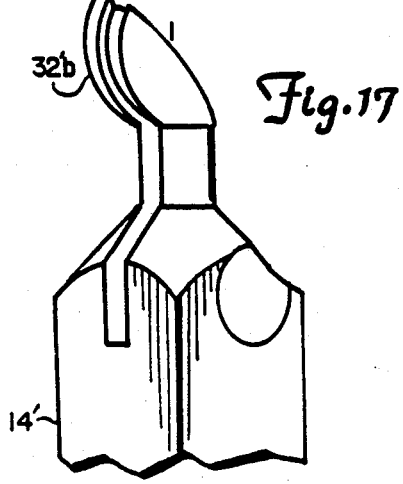

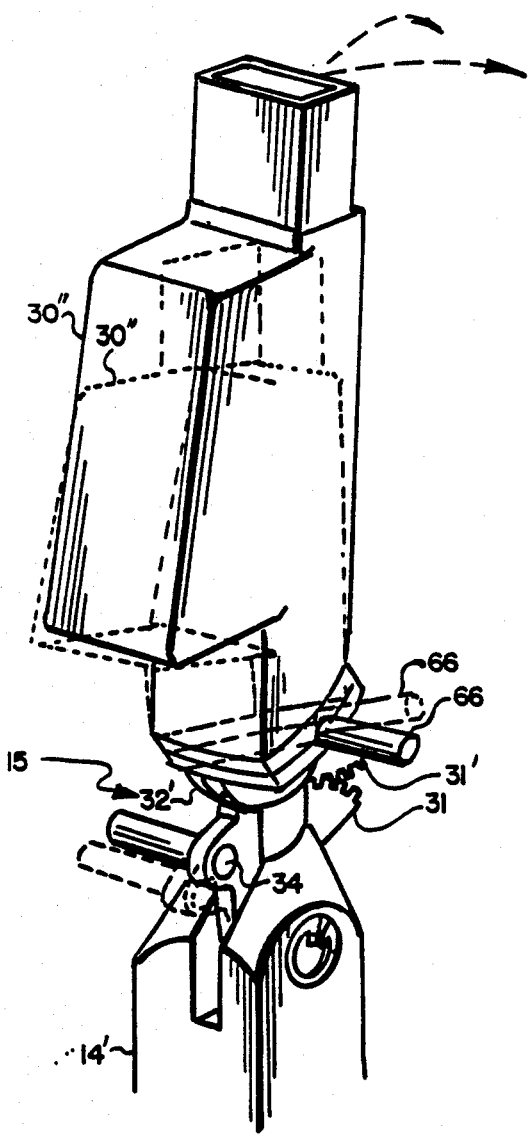
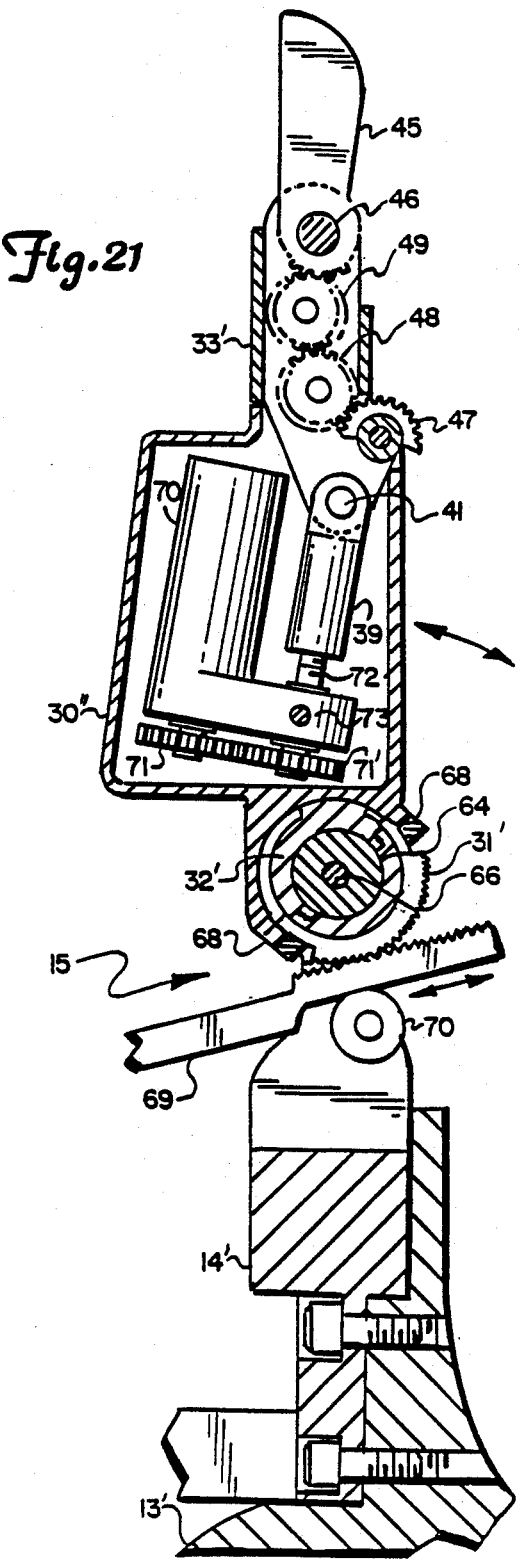
Fig.20
Fig.21

ROBOT JOINTS

REFERENCE TO CO-PENDING APPLICATIONS

Reference is hereby made to a co-pending application by M. E. Rosheim entitled "Wrist Tendon Actuator" having Ser. No. 07/016,943 which was filed on Feb. 20, 1987, and which is assigned to the same assignee as the present invention. This co-pending application discloses subject matter used for similar purposes as that disclosed herein but does not claim that which is specifically disclosed and claimed herein.

BACKGROUND OF THE INVENTION

The present invention relates to controlled motion mechanical members used as a mechanical manipulator and, more particularly, to a controlled motion anthropomorphic mechanical manipulator providing some of the capabilities of a human hand.

The need to increase industrial automation, and the desire to increase the use of animated figures depicting animals, humans or other characters in entertainment situations, has spurred the development of robotics. As a result, substantial advances have been made in many aspects of robotics.

Perhaps the most widely used controlled component in robotic systems is the mechanical manipulator, that portion of a robot used to change the position or orientation of selected objects. In many instances, such mechanical manipulators are desired to have capabilities similar to those of the human wrist, palm, knuckles and sections between the knuckles of the fingers and the thumb. In many instances in the animation of figures, the shape of the mechanical manipulator must also be similar to that of the human hand.

The human wrist displays two degrees of freedom in the motions available thereto with respect to the forearm, as do the initial knuckles of the fingers and thumb, with respect to the palm, which knuckles join the fingers and thumb to the palm. The other knuckles of the fingers and thumb primarily exhibit a single degree of freedom in the motion permitted thereto with respect to the preceding finger or thumb section Thus, a mechanical manipulator demonstrating some of the capabilities of the human hand must contain joints capable of motion with two degrees of freedom, as well as contain joints capable of motion with a single degree of freedom. Such joints must be individually controlled in each of the degrees of freedom which it exhibits in its motion, and this control must be exercisable with reasonable precision. In addition, in those instances where the mechanical manipulator is to be covered so as to have an external appearance something like a human hand, the structure for the joints and the controls must be geometrically arranged to permit their being covered in a manner which will result in the desired appearance. Such joints must be capable of many repeated uses without degradation due to excessive wear.

SUMMARY OF THE INVENTION

The present invention provides a controlled relative motion system comprising a ball-like arrangement on a support, the ball arrangement positioned in a capture device or socket device in which the ball is free to move such that the capture device can rotate in various directions about the ball arrangement. A plurality of connectors, including first and second connectors, connect a plurality of force imparting arrangements to fixed points in the capture device, including first and second force imparting arrangements. The second force imparting arrangement is capable of approaching or receding from the first force imparting arrangement during selected rotations of the capture device about the ball arrangement.

The capture device is formed with a socket having a generally hemispherical recess past an equator thereof, with a circumferential slot in the ball in which a movable member is positioned that is also connected to the capture device as the first connector. The first connector can be a gear sector means which may have a driving gear means or rack means meshed therewith to serve as the first force imparting arrangement. The first force imparting means can also be directly connected to the movable member.

Either a parallelogram linkage or a connecting rod can be used in the axis orthogonal to that along which the movable member is positioned to control motion of the capture device along this orthogonal axis. Further such joints can be used mounted on the same support, or one may be mounted on the capture device of another.

In addition, a single degree of freedom joint can be used mounted on the capture device of one of the previously described joints. This joint can be operated using a driven screw to move the rotary member thereof with respect to the base member. A further dependent joint may be mounted on this rotary member.

The force imparting means may include linear actuators. The motors therefor can be mounted directly on the forearms, on joint bases, or on a previous joint base using a universal joint in that previous joint.

BRIEF DESCRIPTION OF THE DRAWINGS

FIG. 7 shows a cross section view of an addition to the invention shown in FIG. 1, FIG. 8 shows a cross section view of an alternate embodiment of a portion of the invention shown in FIG. 1, FIG. 9 shows an exploded view of a portion of the invention shown in FIG. 8, FIG. 15 shows a side view of the invention shown in FIG. 14, FIG. 16 shows a cross section view of a portion of the invention shown in FIG. 14, FIG. 17 shows an exploded view of a portion of the invention shown in FIGS. 14, 15 and 16, FIG. 20 shows a pair of alternate positions for a portion of the invention shown in FIG. 14, FIG. 21 shows an alternate embodiment of the invention shown in FIG. 14.

DETAILED DESCRIPTION OF THE PREFERRED EMBODIMENTS

Figure 1:
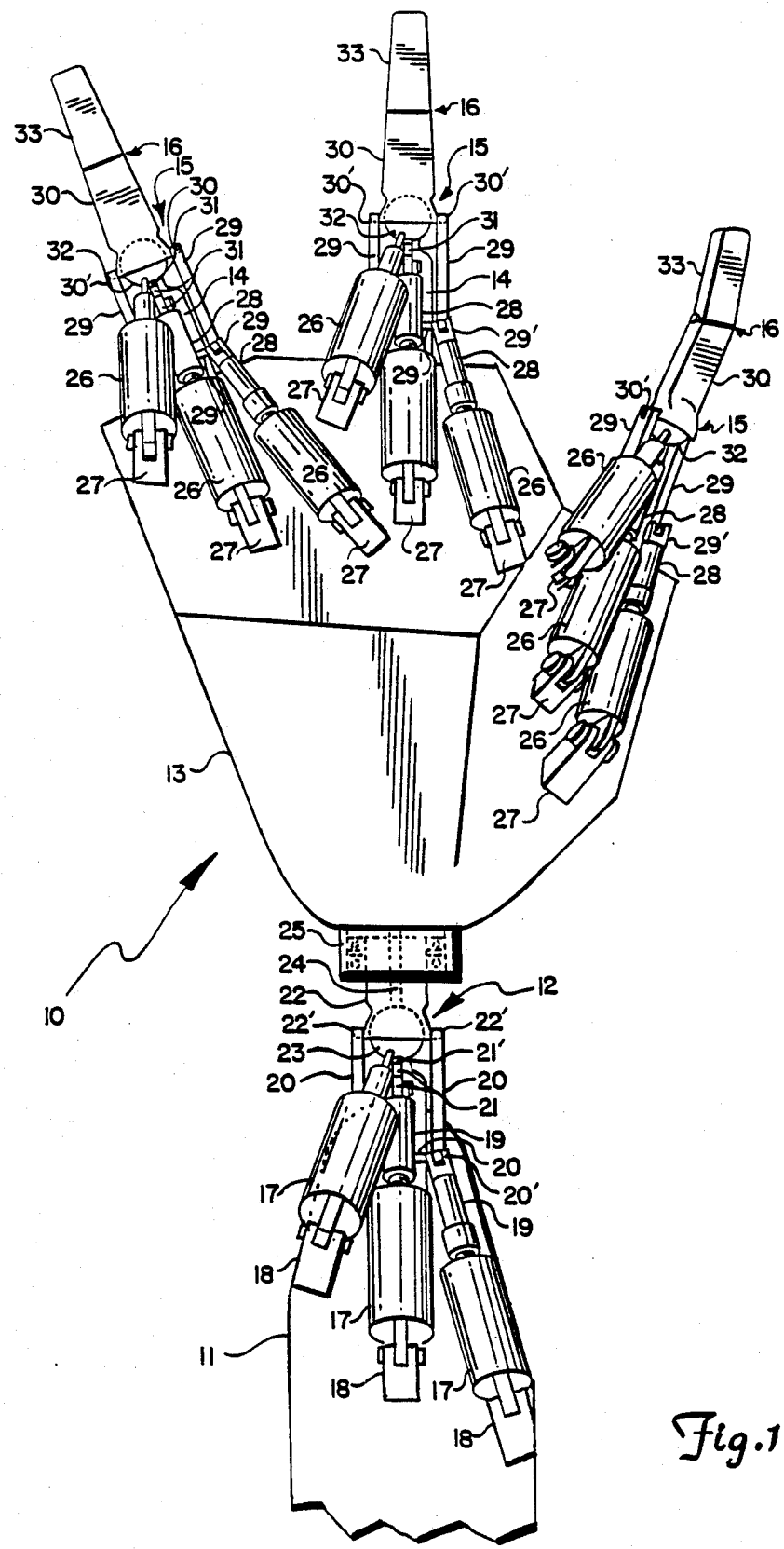
FIG. 1 shows an embodiment of the mechanical manipulator of the present invention.

FIG. 1 shows a portion of a mechanical manipulation system, 10, which bears some similarities to a portion of a human forearm, wrist, hand, two fingers and a thumb. The forearm portion, 11, serves as a base for a wrist-like joint, 12, capable of two degrees of freedom motion. The other, upper side of joint 12, movable with respect to base 11, is connected to a further base means, 13, which serves some of the functions of the palm portion of the human hand.

Base 13 has mounted thereon base extensions, 14, to serve as the bases for first or initial knuckle-like joints, 15, of the two finger-like series of joints and the thumb-like series of joints. Each of knuckle-like joints 15 also exhibits two degrees of freedom motion. The other side of joints 15 each serves as a base member for a further single degree of freedom motion joint, 16, serving as a second knuckle in the two finger-like series of joints and the thumb-like series of joints.

Joint 12, having two degrees of freedom of motion, needs just two drive motors to provide the forces necessary for driving the joint in each of two orthogonal axes. However, three drive motors, 17, have been shown in FIG. 1 each having the end thereof opposite its actuator shaft connected a by pivot pin-pivot base, 18, to the back of base portion 11.

The two motors 17 for joint 12 on the right in FIG. 1 are used to force the upper part of joint 12 to move with respect to the lower part in response to forces applied thereby to this upper part of joint 12 in orthoganal directions. These motors 17 apply such forces through having extensions of their shafts threaded and engaged with threaded sleeves, 19, connected to appropriate parts of the upper part of joint 12, i.e. so that the threaded motor shafts and the sleeve on each together form screw drives Thus, the two right-hand motors 17 below joint 12, each having its threaded shaft engaged with its threaded sleeve 19, together form linear actuators providing forces parallel to the motor shaft axis.

The far right-hand motor 17 below joint 12 in FIG. 1 has the threaded sleeve 19 associated therewith connected to a parallelogram linkage arrangement, 20, through a rotary ball joint, 20'. Parallelogram linkage 20 is also connected to an upper portion, 22, of joint 12 at rotary ball joints, 22'. The central motor 17 below joint 12 has its associated threaded sleeve 19 connected to a drive gear sector, 21, which meshes with a driven gear sector, 21'. Driven gear sector 21' is also connected to upper part 22 of joint 12 and is movably positioned in a circumferential slot in a ball arrangement, 23.

The far left motor 17 below joint 12 in FIG. 1 has its shaft extending into ball arrangement 23 which is mounted on a portion of base 11 serving as the lower part of joint 12. This shaft ends in a universal joint inside ball arrangement 23 to which joint is connected a further shaft, 24. Shaft 24 is connected to base 13 permitting it to rotate about the upper part of joint 12 to which base 13 is connected by a ball bearing arrangement, 25.

Such a capability of rotating base 13 with the two finger-like series of joints and the thumb-like series of joints mounted thereon is unlike the capabilities permitted to the human hand. This arrangement provides a third degree of freedom in connection with joint 12. This added degree of freedom is useful in some situations and has therefore been included in FIG. 1, though its omission would still allow joint 12 to operate as a two degree of freedom of motion joint.

Each of the two finger-like series of joints and the thumb-like series of joints is also shown in FIG. 1 having three linear actuators provided therefor. Again, the motors, 26, therefor are each mounted on a pivot pin-pivot support, 27, this time mounted on base 13. Each of the two right-hand motors 26 associated with one of the finger-like series of joints or the thumb-like series of joints has a threaded shaft inserted into an associated threaded sleeve, 28, to provide a screw drive for the linear actuator of which it is a part. Of the two linear actuators to the right associated with each series of joints, the far right-hand one is again connected to a parallelogram linkage, 29, by a rotary ball joint, 29'. The upper connections of the parallelogram linkages 29 are each connected to an upper member, 30, of knuckle joints 15 at rotary ball joints, 30', these upper, rotary members 30 for joints 15 also serving as bases for joints 16.

The second of the two right-hand motors for each joint 15, or the middle motor, and its threaded sleeve 28, forming a linear actuator, operate drive gear sectors, 31, which are meshed with driven gear sectors, 31'. Driven gear sectors 31' are each connected to an upper member portion 30 of a joint 15 and are movably positioned in a circumferential slot in a ball arrangement, 32.

Again, that motor 26 to the far left in each group thereof associated with a finger-like series of joints or the thumb-like series of joints has a drive shaft which extends into ball arrangement 32 to connect with a universal joint (not shown in FIG. 1) therein. Also, again, there is another shaft (not shown in FIG. 1) connected to each such universal that joint extends into the corresponding member thereabove, here being a joint 15 upper part 30. Each of these shafts extends into a threaded sleeve arrangement to provide a screw drive to operate the upper part or rotary member, 33, of joints 16. This arrangement is better seen in the cross section view taken in FIG. 2 of the right-hand finger-like series of joints of FIG. 1. The same designations are used for the same components shown in each of FIGS. 1 and 2. Only the upper portion of base 13 is shown in the cross section view of FIG. 2. Base extension 14 is shown in FIG. 2 bolted to the upper portion of base 13.

Figure 2:
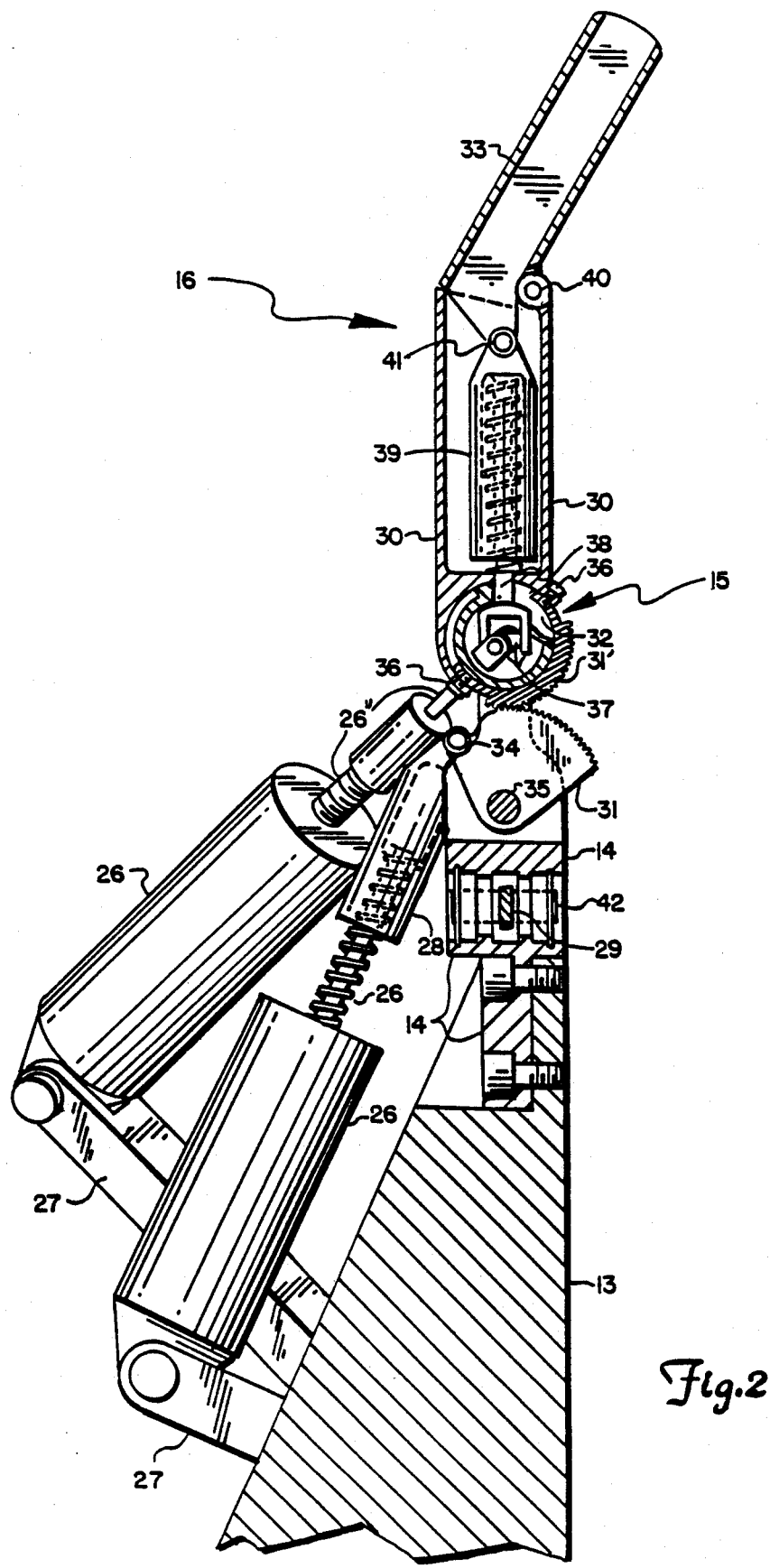
FIG. 2 shows a cross section view of a portion of the invention shown in FIG. 1.

The central and left-most motors 26 of the finger-like series of joints nearest the thumb-like series of joints is shown in FIG. 2. The threaded shaft of the center one of motors 26, designated 26' in FIG. 2, is shown in phantom lines fitted into its threaded sleeve 28. That threaded sleeve can be seen to be connected by a pivot pin, 34, to drive gear sector 31 which in turn is mounted by a pivot pin, 35, on base extension 14. Drive gear sector 31 is shown meshed with driven gear sector 31' which is connected to member 30 by welded pins, 36.

Ball arrangement 32 is shown in cross section in FIG. 2 revealing its hollow interior in which is provided a universal joint, 37, as indicated above. The lower yoke of joint 37 is connected to that extended shaft, 26'', provided in the left-most motor 26 in FIG. 1 for the finger-like series of joints next to the thumb-like series of joints. This lower yoke of joint 37 is connected by a cross piece to the upper yoke of joint 37. This upper yoke of joint 37 is connected to a threaded shaft, 38, as indicated above, which extends into a threaded sleeve, 39, to operate the upper or rotary part 33 of joint 16. Rotary part 33 is connected to lower part 30 of joint 16 (upper part of joint 15) by a pivot pin, 40. A further pivot pin, 41, connects rotary part 33 to threaded sleeve 39.

Thus, rotation of shaft 26'' leads to turning shaft 38 through joint 37, and thereby either extending or retracting threaded sleeve 39 parallel to the axis of shaft 38 to operate rotary part 33 about pivot pin 40. The rotation of shaft 26', on the other hand, leads to extending or retracting its sleeve 28 parallel to the axis of shaft 26' to cause drive gear sector 31 to rotate about pivot pin 35, such rotation leading to rotating driven gear sector 31' and member 30 about ball arrangement 32.

Figure 3:
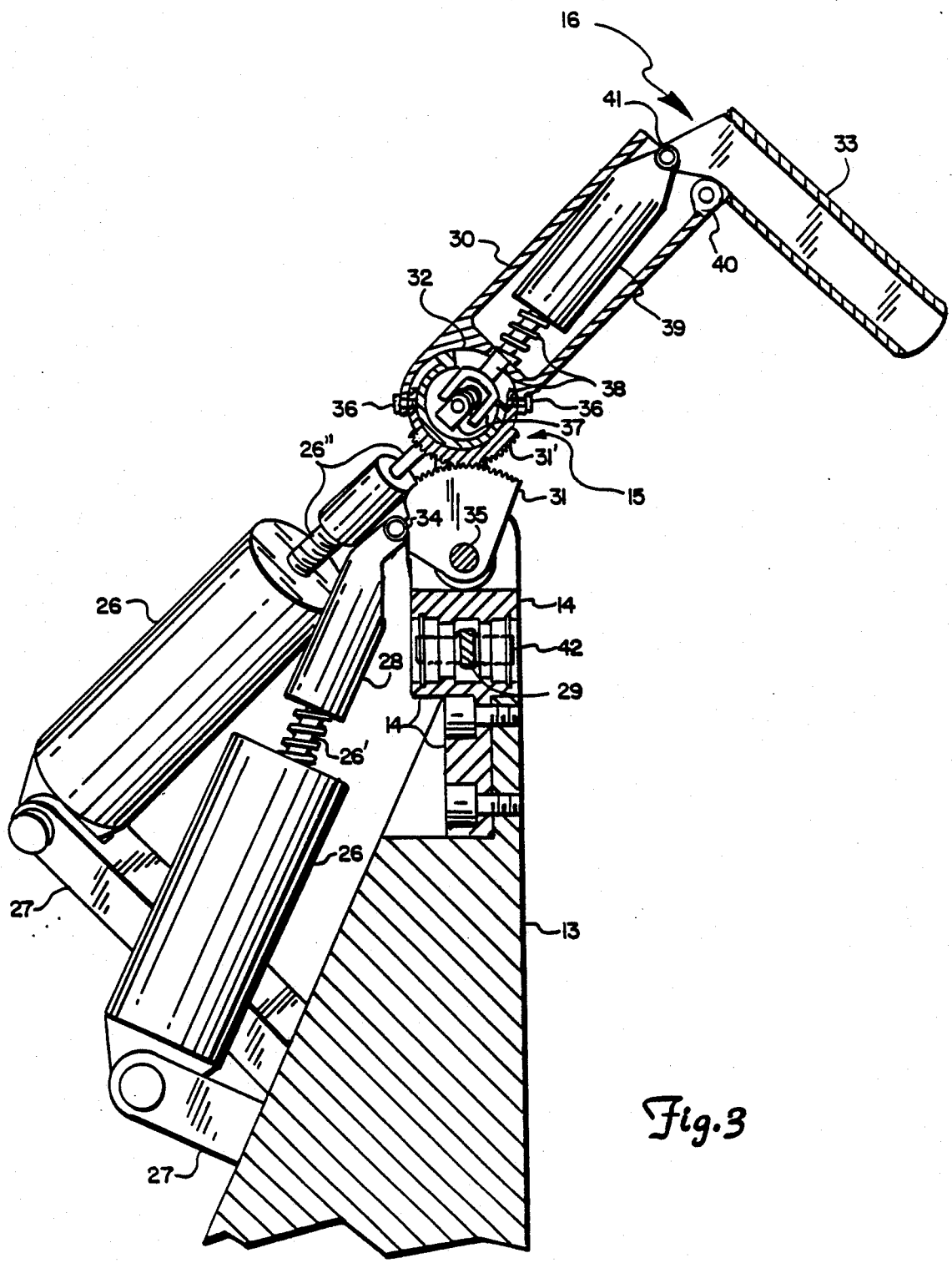
FIG. 3 shows a cross section view of a portion of the invention shown in FIG. 1 with a portion thereof shown in an alternate position.
Figure 4:
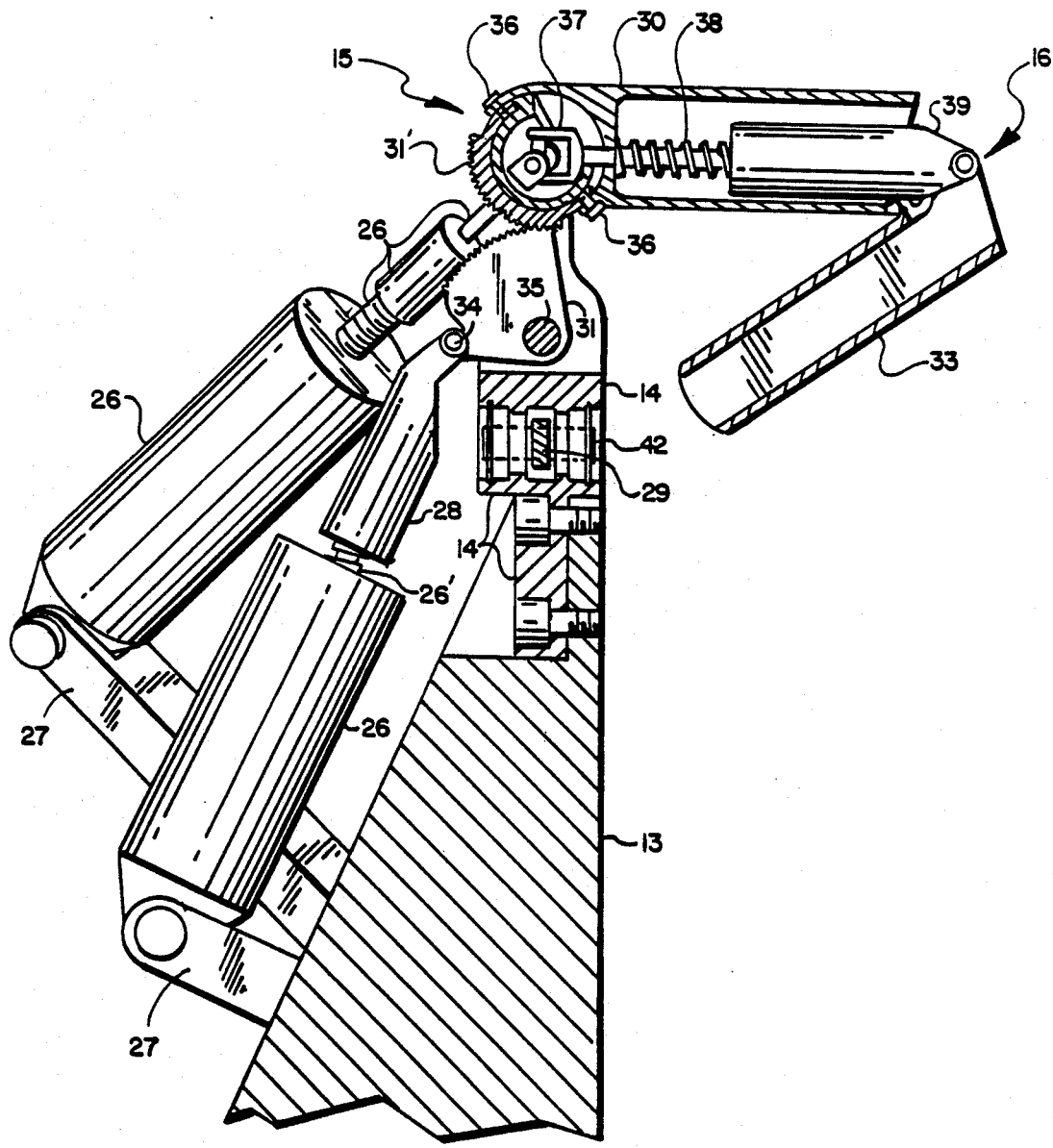
FIG. 4 shows a cross section view of a portion of the invention shown in FIG. 1 with a portion thereof in an alternate position.

Two positions for members 30 and 33 which can result from rotation of shafts 26' and 26'' are shown in FIGS. 3 and 4 with respect to the position of FIG. 1. FIG. 2 shows member 30 and member 33 positioned at one limit of rotation. Member 30 is rotated about an axis of joint 15 perpendicular to the plane of FIG. 2 to its counterclockwise limit. The rotation of joint 16 to its limit in the same counterclockwise direction is also shown in FIG. 2.

FIG. 4 alternatively shows members 30 and 33 positioned as a result of (i) the rotation of joint 15 about the same axis to its clockwise limit, and (ii) the rotation of joint 16 about pivot pin 40 to its opposite, clockwise limit. FIG. 3 then shows the positioning of members 30 and 33 as a result of the rotations of (a) member 30 about the same axis of joint 15 rotating to an intermediate position, and of (b) joint 16 rotating to an intermediate position about pivot pin 40.

Figure 5:
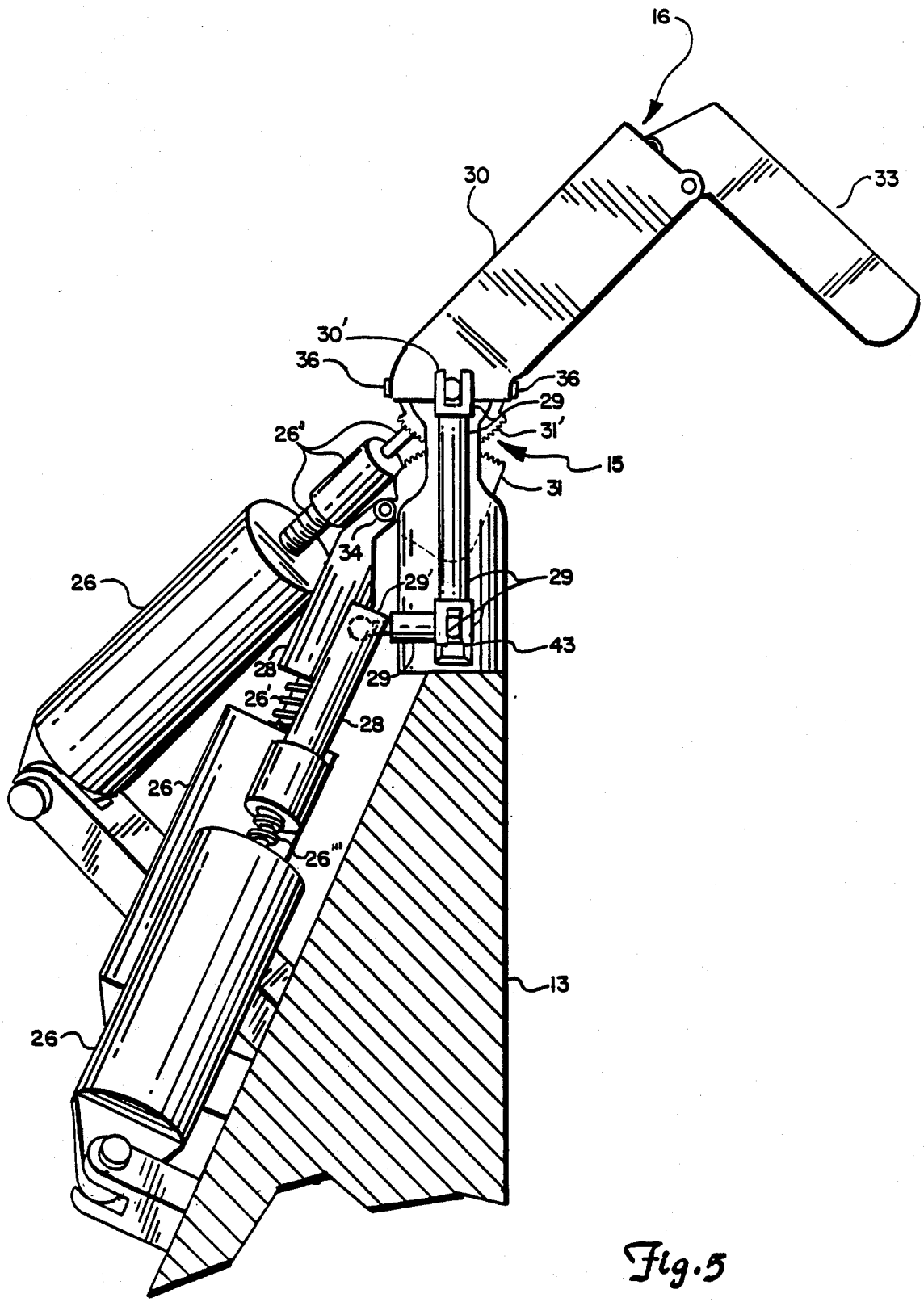
FIG. 5 shows a cross section view of a lesser portion of the invention shown in FIG. 1 than shown in FIG. 3 with a portion thereof in the alternate position of FIG. 3.

A pivot pin, 42, mounted in base extension 14 to which one of the bars of parallelogram linkage 29 is connected is shown in FIGS. 2, 3 and 4. This linkage arrangement is shown in greater detail in FIG. 5 where a more complete view of the side of parallelogram linkage 29 is shown. The positions of members 30 and 33 in FIG. 5 are similar to those shown in FIG. 3. In addition, there has also been shown in FIG. 5 the right-hand motor 26 and its threaded sleeve 28 for the finger-like sequence of joints next to the thumb-like sequence of joints in FIG. 1. The threaded shaft of this motor has been designated 26'''.

The one side of parallelogram linkage 29 which can be clearly seen in FIG. 5 has the bar pivoting about a pivot pin 42 extend to a further rotary bar joint, 43, where it connects with the vertical side bar of linkage 29. A similar arrangement is provided on the opposite side of extension 14. The vertical side bar of parallelogram linkage 29 extends between rotary ball joint 43 and rotary ball joint 30'. Rotary ball joint 29' has an extension leading therefrom to rotary ball joint 43. Thus, rotating shaft 26''' extends or retracts its threaded sleeve 28 to cause the portion shown of parallelogram linkage 29 to move upward or downward, respectively, and so rotate member 30 over ball arrangement 32, either away from or toward the viewer. That is, rotation of shaft 26''' causes member 30 of joint 15 to rotate over ball arrangement 32 about an axis perpendicular to that about which the sequence of positions occurred in FIGS. 2, 3 and 4.

No separate sequence of positions have been shown for this motion, as were shown resulting from motion of sector gear 31 driven by the rotation of shaft 26' in FIGS. 2 through 4. The motion resulting from driving only parallelogram linkage 29 by the rotation of shaft 26''' is a side-to-side motion that provides positions for members 30 and 33 that are easily understood from FIG. 1. That is, the finger-like series of joints next to the thumb-like series of joints merely moves toward and away from the thumb-like series of joints for retractions and extensions of threaded shaft 26''' in FIG. 5.

Figure 6:
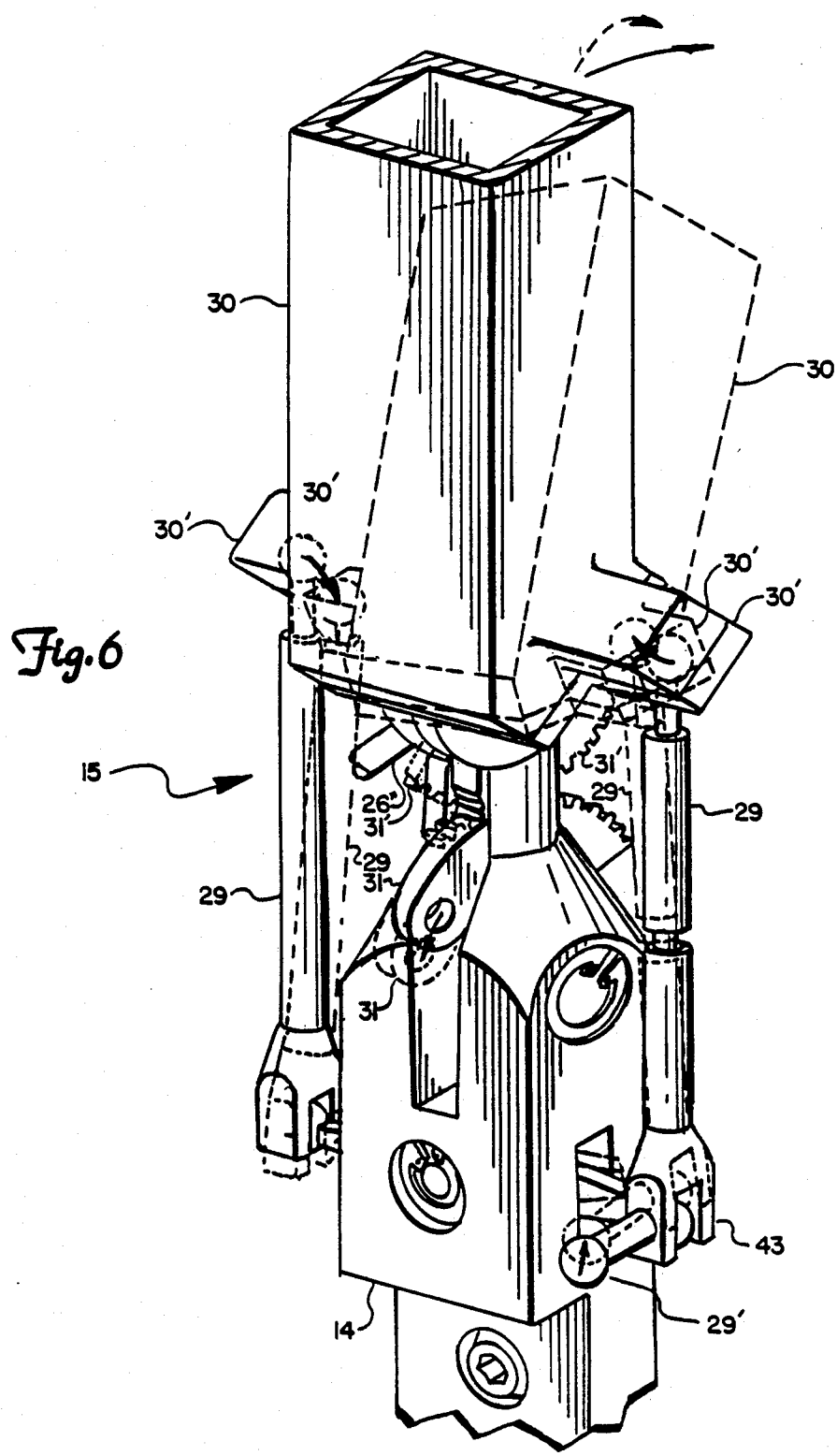
FIG. 6 shows a pair of alternate positions for a portion of the invention shown in FIG. 1.

Simultaneous forcing of parallelogram linkage 29 and drive gear sector 31 results in a compound motion of member 30, which occurs in a direction that is not parallel to the direction that member 30 moves under the individual forcing of either gear sector 31 or parallelogram linkage 29 alone. This can be seen in the representation of FIG. 6 where the initial solid line position of member 30 is similar to that position it had in FIG. 2. The dashed line position shown for member 30 results from a substantial upward or effectively counterclockwise force on the right-hand side of parallelogram linkage 29 applied at the shown portion of rotary ball joint 29', coupled with a downward or effectively counterclockwise force on drive gear sector 31 at the portion thereof in which pivot pin 34 would be placed if shown. As can be seen, the far end of member 30 travels leftward and downward in the view in FIG. 6 in the compound motion resulting from the forces just described being applied to parallelogram linkage 29 and drive gear sector 31. Thus, this compound motion is a motion that is not parallel to the primary axes defined by the direction of force application to either drive gear sector 31 or parallelogram linkage 29 alone. As can be seen in FIG. 6, the rotary ball joints 19' must slightly approach and recede from drive gear sector 31 and portions of driven gear sector 31' during a compound motion.

FIG. 7 shows the addition of a further rotary joint, 44, to member 33 of FIGS. 1 through 5. This rotary joint, however, is not independently controllable as is rotary joint 16 which is controlled by the rotation of shaft 26''. Rather, joint 44 comprises a rotary member, 45, which is mounted on a base member that is also the upper part of joint 15 which has been redesignated in FIG. 7 as member 33'. Member 45 is connected to member 33' by a pivot pin, 46. The rotation of shaft 26'' to change the angle of member 33' with respect to member 30 at joint 15 also changes the angular relationship of rotary extension 45 with respect to member 33' at joint 15. This is similar to the motion occurring in the last section of the human finger beyond its last joint, a section which also changes its angular position if the middle knuckle of the human finger is bent.

Rotation of rotary member 45 with the angular change in position of member 33' with respect to member 30 is accomplished through a gearing arrangement contained within member 33' as shown in FIG. 7. A gear sector, 47, is added to pivot pin arrangement 40 which accordingly has been redesignated 40' in FIG. 7. Gear sector 47 is fixed with respect to member 30. A pair of gears, 48 and 49, are meshed together with gear 49 also being meshed to gear sector 47. Gear 49 is also meshed with a portion of rotary member 45 which has had gear teeth formed therein.

Thus, the rotation of motor shaft 26" causes shaft 38 to turn through universal joint 37, as can be seen in FIG. 2, to rotate member 33' about pivot pin 40' as can be seen in FIG. 7. Since gear sector 47 is fixed in position, the rotation of member 33' results in gear 48 being rotated as it travels across the face of sector 47. As a result, gear 49 is rotated in the opposite direction, and rotary extension 45 is also rotated, again in a reverse direction from that taken by gear 49. The choice of gear ratios determines the amount of motion of rotary extension 45 with respect to member 33' for a given rotation of that member with respect to member 30.

FIG. 8 shows a portion of a cross section of a joint 15 using an alternative kind of universal joint in place of the universal joint shown in FIG. 2. Thus, the universal joint shown in FIG. 8 has been redesignated 37'.

An exploded view of this universal joint is shown in FIG. 9. The shaft 26" from the motor 26 operating this joint is affixed to a spherical member, 50, having either a pair of pins on opposite sides thereof located on an extension of a diameter of sphere 50, or, as done here, having a shaft, 51, extending therethrough and beyond along a diameter of sphere 50. Shaft 51 has chamfered ends. Sphere 50 fits into a truncated spherical shell, 52, with shaft 51 fitted in holes, 53, provided in shell 52. Spherical shell 52 has a pair of pins, 54, located on an extension of a diameter thereof and again has chamfered ends. Pins 54 fit into a further pair of holes, 55, in another truncated spherical shell, 56, in which spherical shell 52 is fitted. Spherical shell 56 has a further opening, 57, therein with splines which are meshed with splines on the end of a modified threaded shaft for controlling operation of joint 16, this shaft being redesignated 38' here to reflect the addition of the splines.

Figure 10:
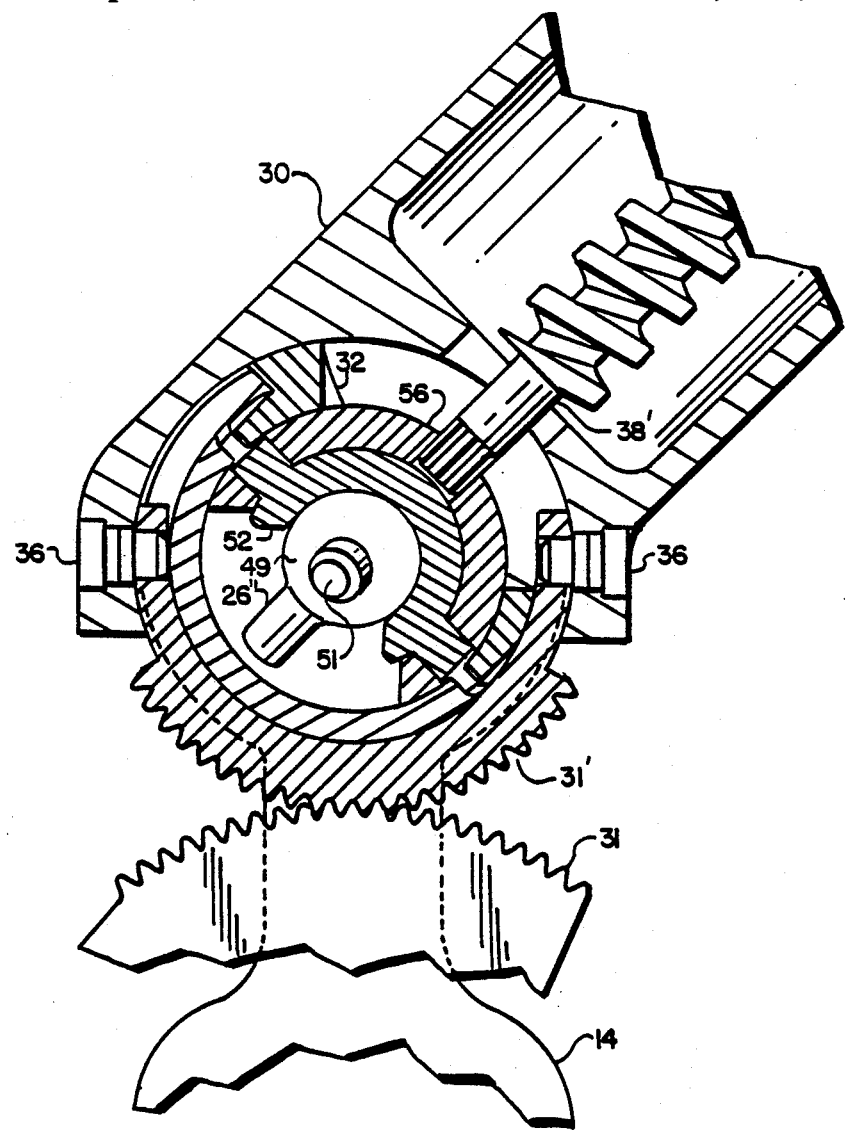
FIG. 10 shows a cross section view of a portion of the invention shown in FIG. 8.

Spherical shell 56 can be seen in FIGS. 8 and 10 to fit within the hollow interior of ball arrangement 32. Since spherical shell 56, to a considerable extent, fills the interior cavity of ball arrangement 32, universal joint 37' is maintained well positioned in the center of the cavity in ball arrangement 32 and supported by the walls thereof. This prevents impacts with the interior sides of ball arrangement 32 during operation which can occur if the universal joint is free to shift its location within the cavity. Further, the truncated spherical shells 52 and 56 of universal joint 37', in avoiding use of many seams and sharply angled members, provide additional strength over the yokes used in universal joint 37 shown in FIG. 2.

Also shown in FIG. 8 is a parallelogram linkage vertical arm length adjusting mechanism, 58. Length adjusting mechanism 58 comprises an upper portion of the linkage vertical arm having an extension, 59, which is contained within an interior opening in the lower part of the linkage vertical arm where this extension is engaged with a trapped spring, 60. Compound motions such as that shown in FIG. 6 lead to the need for a slight adjustment in the length of one of the vertical arms in parallelogram linkage 29.

Figure 11:
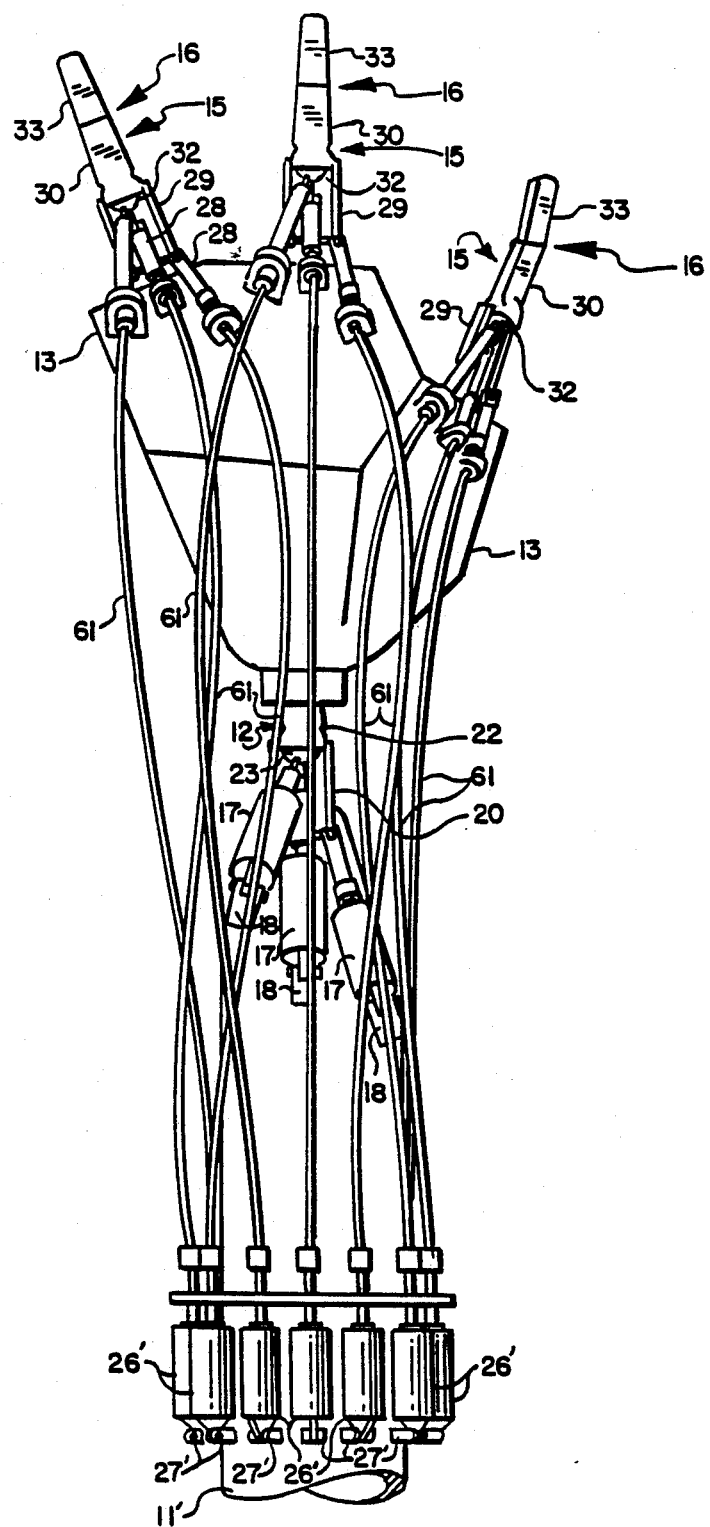
FIG. 11 shows an alternate embodiment of the mechanical manipulator of the present invention as shown in FIG. 1.

The mounting of motors 26 for controlling the two finger-like series of joints and the thumb-like series of joints mounted upon base 13 can be inconvenient at times because of the bulk such motors have. FIG. 11 shows an alternative arrangement for mounting the motors 26 on the same base as are mounted motors 17 used for controlling joint 12. These relocated motors in FIG. 11 have been redesignated 26' there and, further, base 11 of FIG. 1 has been redesignated 11' in FIG. 11, and the pivot mounts for motors 26' have been redesignated 27'. Motors 26' have a cable inside a cable cover arrangement, 61, extending from the shafts of motors 26' to threaded sleeves 28 and to universal joint 37 or 37' in ball arrangement 32. The rotation of the shafts of motors 26' cause the cable to rotate and to turn threaded shafts provided in threaded sleeves 28, or to turn universal joints 37 or 37' as appropriate.

Figure 12:
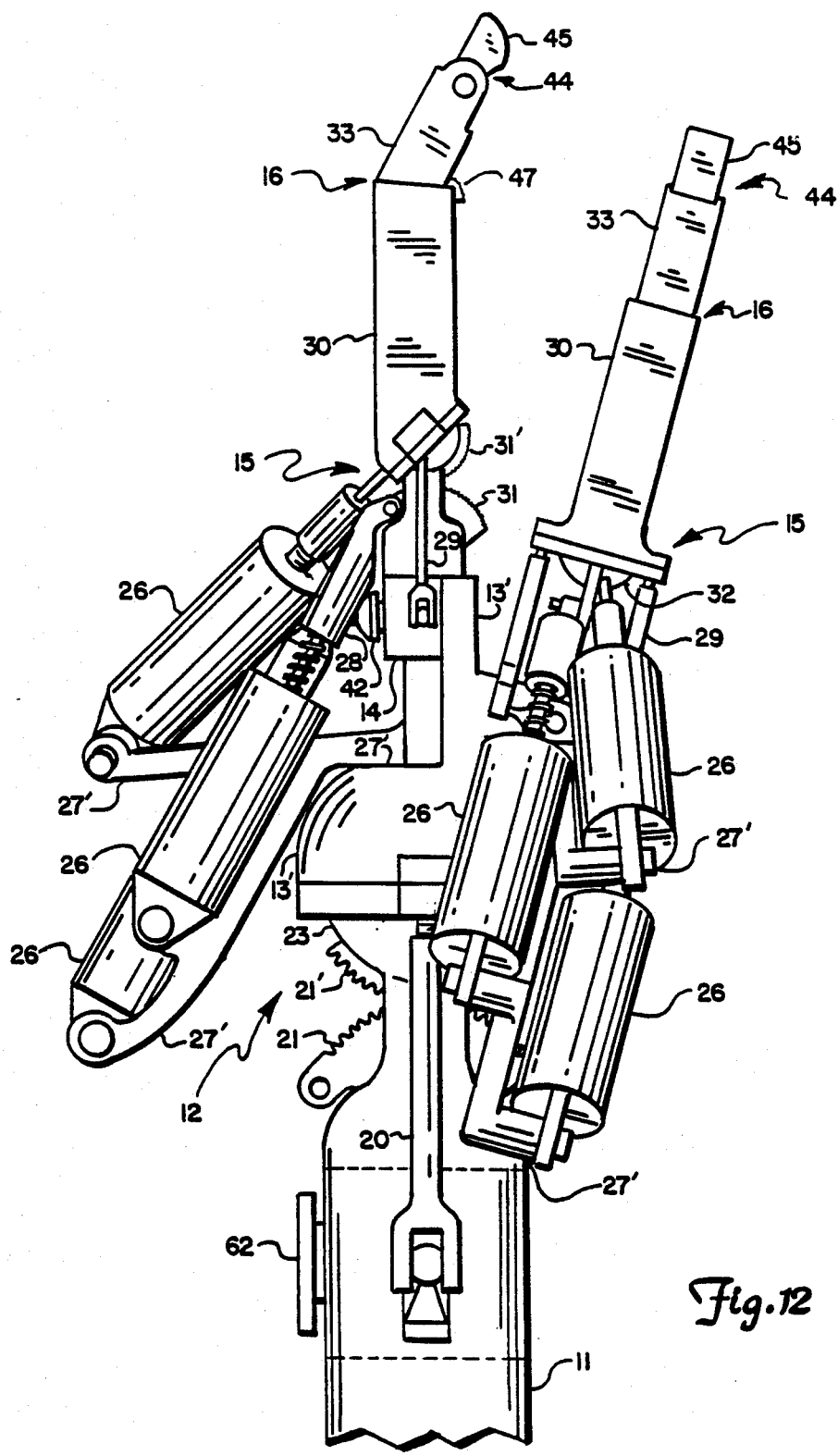
FIG. 12 shows an alternate embodiment of the mechanical manipulator of the present invention.

FIG. 12 provides a side view showing a modification of base 13 in FIG. 1 to shorten it considerably so that the two finger-like series of joints and the thumb-like series of joints mounted thereon are much closer to joint 12. Thus, the base in FIG. 12 has been redesignated 13'.

In addition, base 13' has been shaped to be adapted to have mounted thereon brackets to support motors 26 rather than the use of pivot mounts 18, as in FIG. 1. This allows changing motor types for different applications of the mechanical manipulator by merely changing the brackets on which they are mounted and providing new brackets adapted to the new motors which can be mounted in the same positions on base 13'. The use of fixed pivot mounts 18 in FIG. 1 limits the possible alternative motors which can be used to operate the finger-like and thumb-like series of joints mounted on base 13'. Note that the motor 26 for operating parallelogram linkage 29 of the figure-like series of joints shown approximately vertical in FIG. 12 has been moved so that it connects through its threaded sleeve 28 to the opposite side of linkage 29 from where it has been shown connected in previous figures.

A slightly different pivot pin arrangment for pivot pin 42 is used in the configuration shown in FIG. 12. A pivot pin of this alternative type, 42', is shown extending into base 14 for rotatably holding parallelogram linkage 29. A further pin of this alternative type, 62, is shown extending into base 11 for rotatably holding parallelogram linkage 20.

Figure 13:
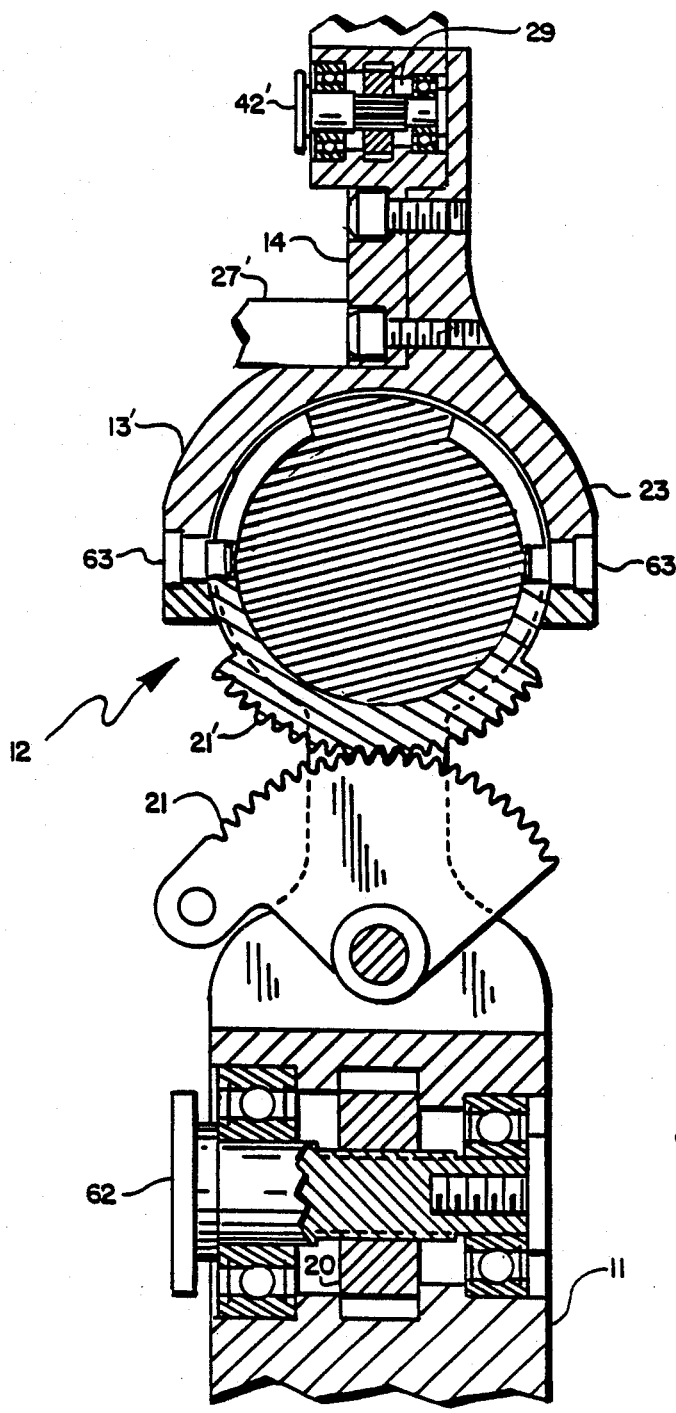
FIG. 13 shows a cross section view of a portion of the invention shown in FIG. 12.

FIG. 13 shows a cross section view of a portion of FIG. 12, a cross section which shows the details of pivot pins 62 and 42'. Joint 12, as shown in FIGS. 12 and 13, is alternatively shown no longer containing a shaft for permitting base 13' to rotate with respect to base 11. Driven gear sector 21' is connected to base 13' by a pair of welded pins, 63.

Figure 14:
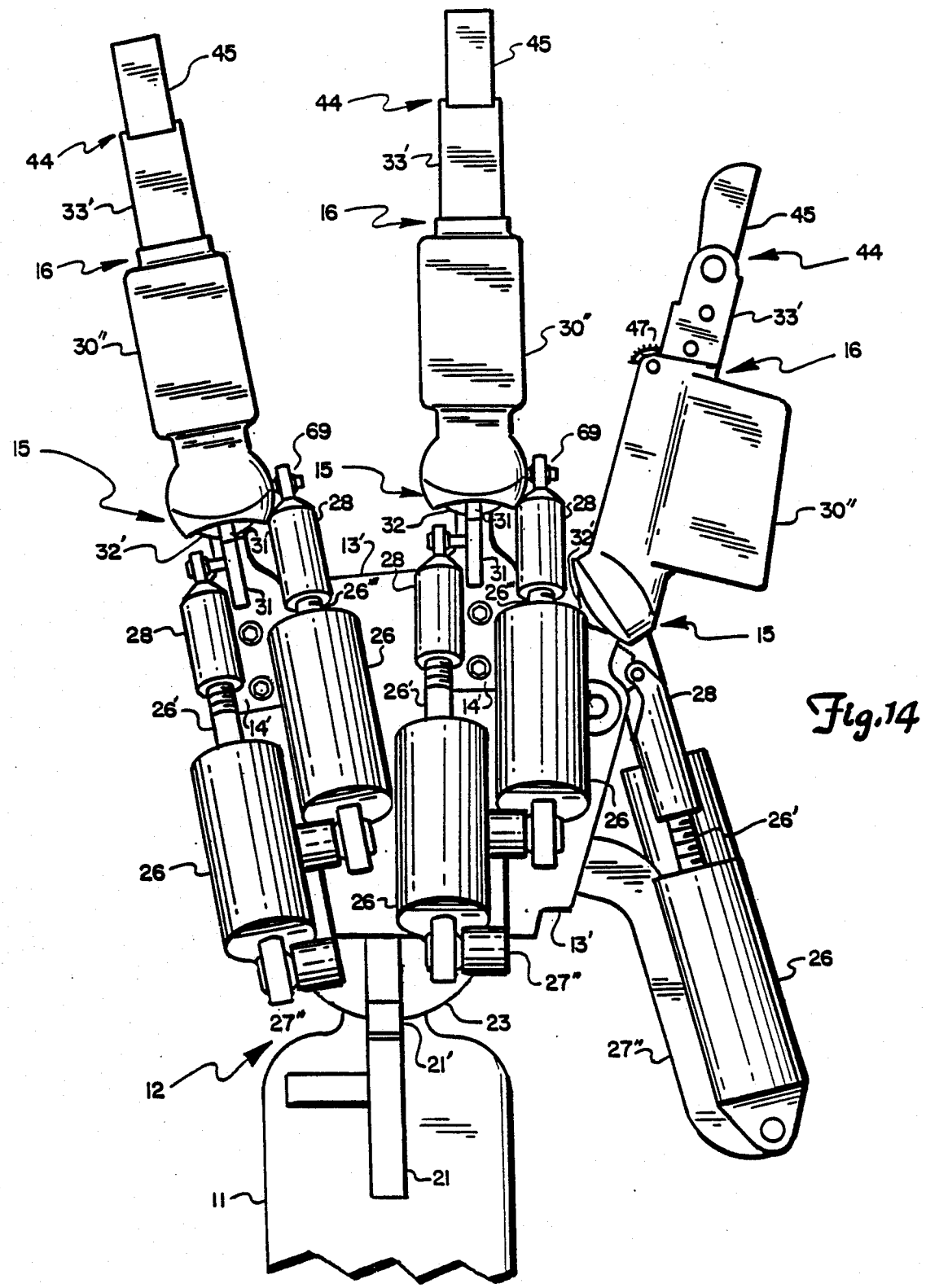
FIG. 14 shows an alternate embodiment of the mechanical manipulator of the present invention.

A further alternative is shown in FIG. 14 in which the same view is shown of the mechanical manipulator there as is shown for the mechanical manipulator of FIG. 1. This alternative can be best understood as being several modifications of the configuration shown in FIG. 12. In these modifications, that one of motors 26 which had been operating joint 16 has been moved from base 13' and incorporated within what had been member 30 in FIG. 2 and is now designated 30" in FIG. 14. As a result, the motor support brackets 27' of FIG. 12 have been modified to support just two motors 26 and so have been redesignated 27" in FIG. 14.

A further modification has been made with respect to joints 15 where the parallelogram linkage arrangement has been eliminated. The linear actuator which operated parallelogram linkage 20 now operates directly on the upper part of joint 15 or member 30". A view from the right side of the mechanical manipulator shown in FIG.

14 is presented in FIG. 15 with the thumb-like series of joints being on the right side in each of FIGS. 14 and 15.

A cross section view of the finger-like series of joints next to the thumb-like series of joints in FIG. 14 is shown in FIG. 16. Base 13' is shown with a new base extension omitting the pivot pin for the parallelogram linkages, this base extension being redesignated 14' in FIGS. 14, 15 and 16. Base extension 14' again has pivot pin 35 therein by which drive gear sector 31 is attached to extension 14'. Drive gear sector 31 is again connected by pivot pin 34 to threaded sleeve 28 which is retracted and extended in position by the rotation of threaded shaft 26' in motor 26. Driven gear sector 31' is again positioned and movable in a slot in a ball arrangement, but here a ball arrangement which does not contain a universal joint and therefore differs from the ball arrangement shown in FIGS. 2 and 10. For that reason, this ball arrangement is redesignated 32' in FIGS. 14, 15 and 16.

The nature of joint 15 and the assemblies connected with ball arrangement 32' are better seen in the exploded view of FIG. 17. Ball joint arrangement 32' can be seen in FIG. 17 to be provided in two sections, 32'a and 32'b. The ability to separate ball arrangement 32' allows the insertion of a spherical member, 64, which has a hole, 65, therethrough in which is inserted a shaft, 66, although two pins can be alternatively used. Shaft 66 extends through conical holes, 67, in ball arrangement 32' to be inserted in a receiving hole inside member 30", and in a hole entirely therethrough, to further aid in holding member 30" against ball arrangement 32'.

A retaining ring, 68, is placed around member 30" to retain driven gear sector 31' in a circumferential slot provided in ball arrangement 32'. A portion of shaft 66 extends past the side of member 30" extending through the hole therethrough sufficiently far so that it engages in a rotary ball joint, 69, shown in FIGS. 14 and 15 with that threaded sleeve 28 which is driven by threaded shaft 26'''.

Member 30" is shown in FIG. 16 having contained therein a further motor, 70, having a driving gear, 71, connected to its shaft. This gear drives a driven gear, 71', connected to a threaded shaft, 72, which is meshed with threaded sleeve 39. Shaft 72 and threaded sleeve 39 again form a screw drive, and together with motor 70 serve as a linear actuator to operate joint 16 in the manner described in connection with FIG. 7 except that this linear actuator can rotate about a pin, 73, mounted in member 30".

Figure 18:
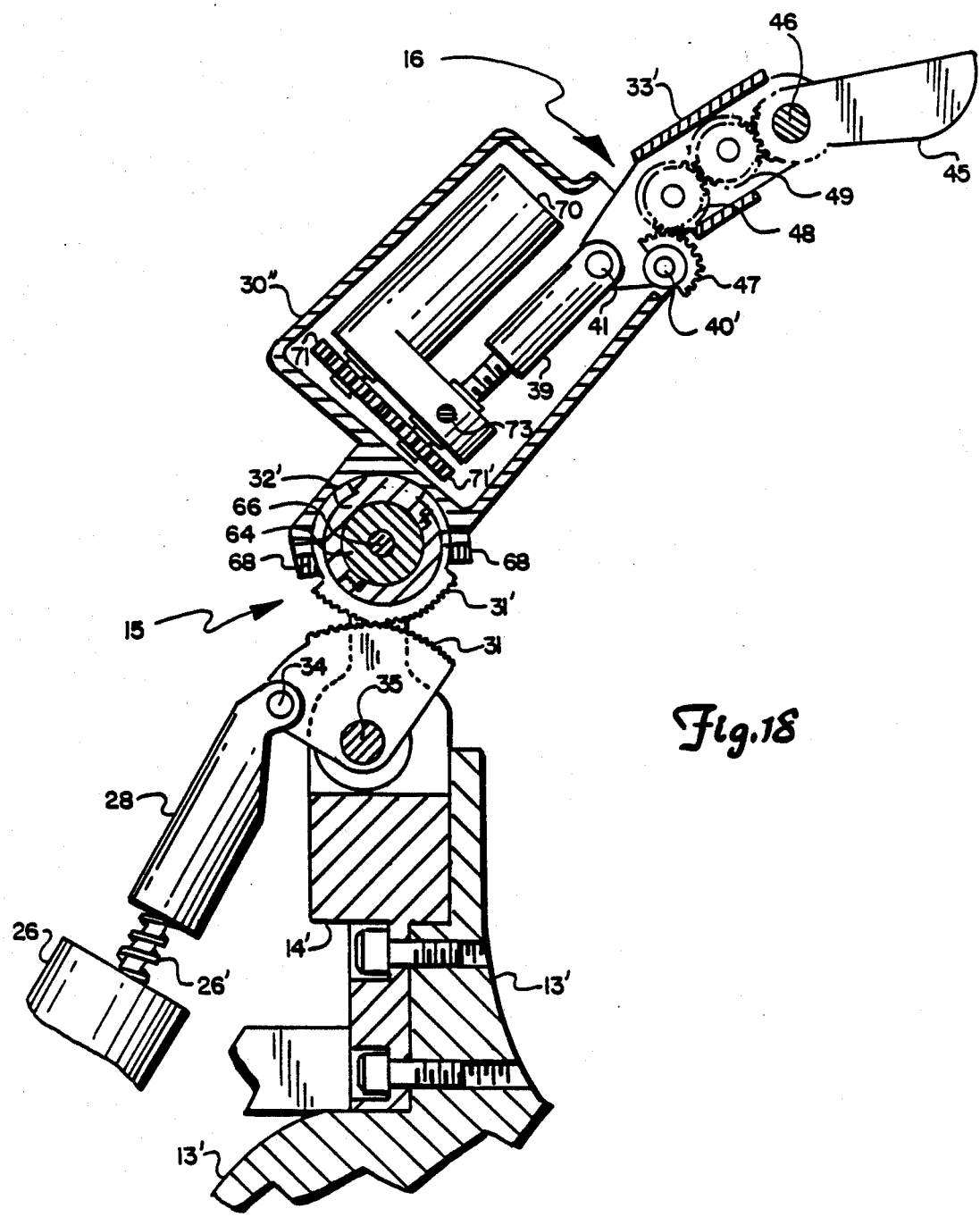
FIG. 18 shows a cross section view of a portion of the invention shown in FIG. 14 with a portion thereof in an alternate position.
Figure 19:
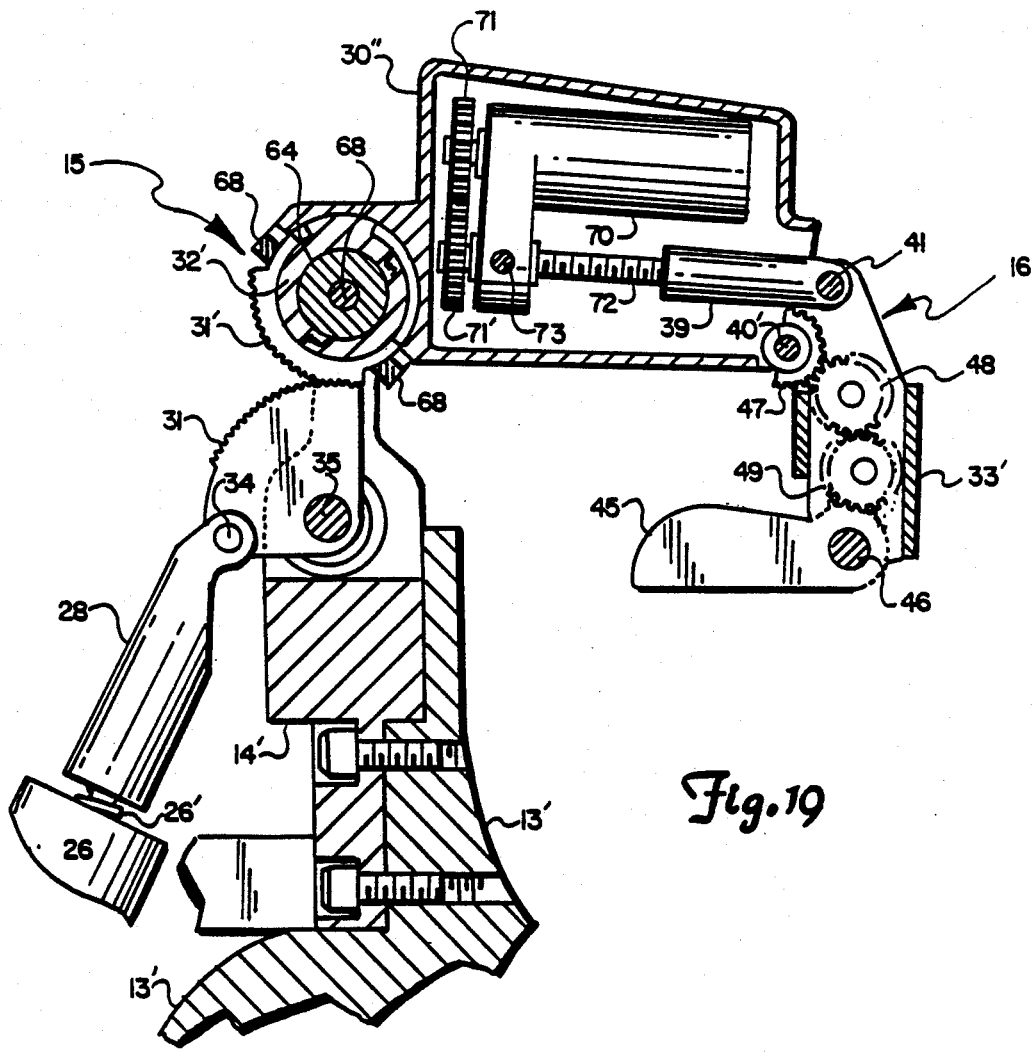
FIG. 19 shows a cross section view of a portion of the invention shown in FIG. 14 with a portion thereof in an alternative position.

FIG. 16 shows finger-like series of joints 15, 16 and 44 at the counterclockwise extremes of the range of motion of the upper part of each, and FIG. 19 shows the opposite extremes of the ranges of motion of each. FIG. 18 shows intermediate angular positions of these finger-like series of joints. As can be seen in this series of figures, extension 45 takes an angular position with respect to member 33' which directly depends on the angle taken by member 33' with respect to member 30" of joint 16 as directed by motor 17.

FIG. 20 shows the relative position taken by the mechanical manipulator with respect to the initial position shown in FIG. 16 due to a compound motion of member 30" with respect to base extension 14'. This motion is the result of rotating drive gear sector 31 counterclockwise with a downward force while forcing shaft 66 upward or effectively counterclockwise. The resulting path followed by member 30" is not parallel to the axes of motion defined by either drive gear sector 31 or shaft 66 being moved alone. As can be seen, the connection of shaft 66 to member 30" moves somewhat toward the front of drive gear sector 31 and driven gear sector 31' while receding somewhat from the rear of these two gear sectors.

Figure 22:
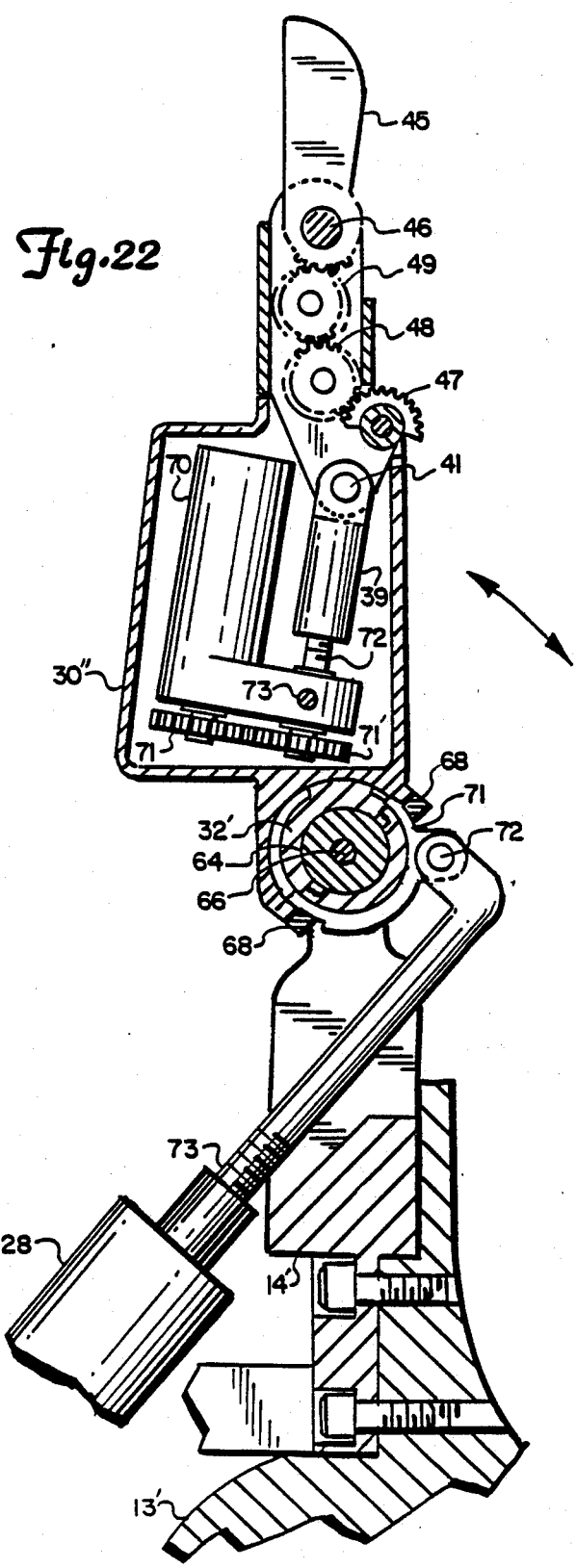
FIG. 22 shows an alternate embodiment of the invention shown in FIG. 14.

FIGS. 21 and 22 show the mechanical manipulator of FIG. 16 in the position taken in that figure but with the use of two alternative drive means for moving member 30" by the member connected thereto by retaining ring 68 movably positioned in a circumferential slot in ball arrangement 32'. In FIG. 21, this member movable in the slot of ball arrangement 32" continues to be driven gear sector 31', but with the means for driving this sector being provided by a rack, 69, rather than drive gear sector 31. Rack 69 is kept engaged in driven gear sector 31' by a rotating sleeve, 70.

In the arrangement of FIG. 22, driven gear sector 31' is replaced with a similarly shaped member, 71, omitting, however, the gear teeth. That is, member 71 is still a slider member rotatably fastened by retaining ring 68 to member 30", but connected by a pivot, 72, to a shaft, 73, in turn connected to a threaded sleeve 28 as part of a linear actuator which can act directly on member 71. Other alternative means for operating member 30" in that axis can also be used. Although the present invention has been described with reference to preferred embodiments, workers skilled in the art will recognize that changes may be made in form and detail without departing from the spirit and scope of the invention.

What is claimed is:

1. A controlled relative motion system permitting a controlled motion member, joined to another base member, to selectively move with respect to that base member, said system comprising:
   a first joint mean comprising:
      a first joint support means;
      a first joint ball means with a generally spherical shape affixed to said first joint support means;
      a first joint equatorial plane capture means having a rotation location in which said first joint ball means is positioned such that said first joint equatorial plane capture means can rotate in multiple directions about said first joint ball means;
      a plurality of first joint force imparting means mechanically connected to said first joint equatorial plane capture means, including a first joint first force imparting means and a first joint second force imparting means each of which permits force to selectively be imparted to said first joint equatorial plane capture means; and
      a plurality of first joint connection means, including a first joint first connection means and a first joint second connection means, with said first joint first connection means rotatably connecting said first joint first force imparting means to said first joint equatorial plane capture means and said second joint second connection means rotatably connecting said first joint second force imparting means to said first joint equatorial plane capture means and with said first joint first and second connection means being fixed with respect to one another at that connection of each in said first joint equatorial plane capture means, said first joint first force imparting means being capable of approaching and receding from said first joint second force imparting means during selected rotation of said first joint equatorial plane capture means about said first joint ball means.

2. The apparatus of claim 1 wherein said first joint ball means is a hollow ball means having a generally spherical opening therein.

3. The apparatus of claim 1 wherein said first joint equatorial plane capture means is formed by a first joint socket means having a recess therein ending in a surface at least partially concave and following a generally hemispherical shape past an equator thereof, there being a circumferential slot in said first joint ball means in which a circumferential sliding means is positioned, and along which it is movable, said circumferential sliding means being connected to said first equatorial plane capture means together around said first joint ball means with said circumferential sliding means comprising said first joint connection means.

4. The apparatus of claim 1 wherein said system further comprises a second joint means mechanically connected to said first joint means, said second joint means comprising:
   a second joint support means;
   a second joint ball means of a generally spherical shape affixed to said second joint support means;
   a second joint equatorial plane capture means having a rotation location in which said second joint ball means is positioned such that said second joint equatorial plane capture means can rotate in multiple directions about said second joint ball means;
   a plurality of second joint force imparting means mechanically connected to said second joint equatorial plane capture means, including a second joint first force imparting means and a second joint second force imparting means, each of which permits force to be selectively imparted to said second joint equatorial plane capture means; and
   a plurality of second joint connection means, including a second joint first connection means and a second joint second connection means, with said second joint first connection means rotatably connecting said second joint first force imparting means to said second joint equatorial plane capture means and said second joint second connection means rotatably connecting said second joint second force imparting means to said second joint equatorial plane capture means and with said second joint first and second connection means being fixed with respect to one another at that connection of each in said second joint equatorial plane capture means, said second joint first force imparting means being capable of approaching and receding from said second joint second force imparting means during selected rotation of said second joint equatorial plane capture means about said second joint ball means.

5. The apparatus of claim 1 wherein said system further comprises a second joint means having a second joint base member and a second joint rotary member which is rotatably connected to said second joint base member such that it can rotate about substantially a single axis with respect to said second joint base member, and further having a second joint first connection means mechanically connected to said second joint rotary member and to a second joint first force imparting means which permits force to be selectively imparted to said second joint rotary member, said second joint base member being mechanically connected to said first joint equatorial plane capture means.

6. The apparatus of claim 2 wherein said interior opening in said first joint ball means contains a retaining sphere through which a retaining pin is placed with said retaining pin extending through first and second access openings in said first joint ball means to be affixed to said first joint equatorial plane capture means.

7. The apparatus of claim 2 wherein said system further comprises a second joint means having a second joint base member and a second joint rotary member which is rotatably connected to said second joint base member such that it can rotate about substantially a single axis with respect to said second joint base member, and further having a second joint first connection means mechanically connected to said second joint rotary member and to a second joint first force imparting means which permits force to be selectively imparted to said second joint rotary member, said second joint base member being mechanically connected to said first joint equatorial plane capture means.

8. The apparatus of claim 3 wherein said first joint second connection means comprises a control pin affixed to and extending from said first joint equatorial plane capture means having a first rotary joint at its end opposite that which is affixed to said first joint equatorial plane capture means, said first rotary joint also being connected to said first joint second force imparting means.

9. The apparatus of claim 3 wherein said first joint second connection means comprises a parallelogram linkage means having a first rotary anchor means rotatably connected to said first joint support means, and a pair of parallelogram arms each rotatably connected between said first joint equatorial plane capture means and said first joint rotary anchor means.

10. The apparatus of claim 3 wherein said circumferential sliding means has gear teeth provided therein.

11. The apparatus of claim 4 wherein said second joint support means is mechanically connected to said first joint equatorial plane capture means.

12. The apparatus of claim 4 wherein said first and second joint support means are mechanically connected to one another.

13. The apparatus of claim 5 wherein said second joint first connecting means is a rotatable screw means mounted in said second joint base member and rotatably connected to said second joint first force imparting means.

14. The apparatus of claim 5 wherein said system further comprises a third joint means having a third joint base member, mechanically connected to said second joint rotary member, and having a third joint rotary member which is rotatably connected to said third joint base member such that it can rotate about substantially a single axis with respect to said third joint base member, and further having a third joint first connection means mechanically connected to both said third joint rotary member and said second joint base member such that angular motion of said second joint rotary member with respect to said second joint base member causes angular motion of said third joint rotary member with respect to said third joint base member.

15. The apparatus of claim 6 wherein said first joint second connection means comprises an extension of said retaining pin extending outward from said first joint equatorial plane capture means have a first rotary joint at its extended end, said first rotary joint being also connected to said first joint second force imparting means.

16. The apparatus of claim 7 wherein said second joint first connecting means comprises a rotatable screw means mounted in said second joint base member and rotatably connected to said second joint first force imparting means.

17. The apparatus of claim 8 wherein said first joint ball means is a hollow ball means having a generally spherical opening therein.

18. The apparatus of claim 9 wherein said first joint second force imparting means is rotatably connected to said first joint rotary anchor means.

19. The apparatus of claim 10 wherein a driving gear means is meshed with said circumferential sliding means gear teeth.

20. The apparatus of claim 11 wherein the system further comprises a third joint means having a third joint base member and a third joint rotary member which is rotatably connected to said third joint base member such that it can rotate about substantially a single axis with respect to said third joint base member, and further having a third joint first connection means mechanically connected to said third joint rotary member and to a third joint first force imparting means which permits force to be selectively imparted to said third joint rotary member, said third joint base member being mechanically connected to said second joint equatorial plane capture means.

21. The apparatus of claim 11 wherein said system further comprises:
 a first plurality of joint means, including said first and second joint means, each of said plurality of joint means comprising:
  a joint support means;
  a joint ball means of a generally spherical shape affixed to said support means;
  a joint equatorial plane capture means having a rotation location in which said corresponding joint ball means is positioned such that said joint equatorial plane capture means can rotate in multiple directions about that joint ball means;
  a plurality of joint force imparting means mechanically connected to said equatorial plane capture means, including a joint first force imparting means and a joint second force imparting means, each of which permits force to selectively be imparted to said corresponding joint equatorial plane capture means;
  a plurality of joint connection means, including a joint first connection means and a joint second connection means, with said joint first connection means rotatably connecting said joint first force imparting means to said joint equatorial plane capture means and said joint second connection means rotatably connected said joint second force imparting means to said joint equatorial plane capture means and with said joint first and second connection means being fixed with respect to one another at that connection of each in said joint equatorial plane capture means, said joint first force imparting means being capable of approaching and receding from said joint second force imparting means during selected rotation of said joint equatorial plane capture means about said joint ball means; and
 a mechanical interconnection array mechanically connecting together each of said first plurality of joint means such that said joint support means of each, other than said first joint support means, is connected to said first joint equatorial plane capture means.

22. The apparatus of claim 12 wherein said first joint first and second force imparting means and said second joint first and second force imparting means are all mechanically mounted on said common connection means.

23. The apparatus of claim 13 wherein said second joint first force imparting means is a motor means mounted outside said second joint base member.

24. The apparatus of claim 14 wherein said third joint first connection means comprises a plurality of gears.

25. The apparatus of claim 16 wherein said second joint first force imparting means is a motor means mounted outside said second joint base member.

26. The apparatus of claim 16 wherein said rotatable screw means extends through said second joint base member and through said first joint equatorial plane capture means, and also through a first access opening in said first joint ball means into said interior opening therein to connect with a universal joint contained within said interior opening of which said second joint first connection is further comprised.

27. The apparatus of claim 17 wherein said interior opening in said first joint ball means contains a retaining sphere through which a retaining pin is placed with said retaining pin extending through first and second access openings in said first joint ball means to be affixed to said first joint equatorial plane capture means.

28. The apparatus of claim 17 wherein said system further comprises a second joint means having a second joint base member and a second joint rotary member which is rotatably connected to said second joint base member such that it can rotate about substantially a single axis with respect to said second joint base member, and further having a second joint first connection means mechanically connected to said second joint rotary member and to a second joint first force imparting means which permits force to be selectively imparted to said second joint rotary member, said second joint base member being mechanically connected to said first joint equatorial plane capture means.

29. The apparatus of claim 18 wherein one of said pair of parallelogram arms contains a length adjusting means.

30. The apparatus of claim 19 wherein said driving gear means serves as part of said first force imparting means.

31. The apparatus of claim 20 wherein said system further comprises a fourth joint means having a fourth joint base member, mechanically connected to said third joint rotary member, and having a fourth joint rotary member which is rotatably connected to said fourth joint base member such that it can rotate about substantially a single axis with respect to said fourth joint base member, and further having a fourth joint first connection means mechanically connected to both said fourth joint rotary member and said third joint base member such that angular motion of said third joint rotary member with respect to said third joint base member causes angular motion of said fourth joint rotary member with respect to said fourth joint base member.

32. The apparatus of claim 21 wherein the system further comprises a third joint means having a third joint base member and a third joint rotary member which is rotatably connected to said third joint base member such that it can rotate about substantially a single axis with respect to said third joint base member, and further having a third joint first connection means mechanically connected to said third joint rotary member and to a third joint first force imparting means which permits force to be selectively imparted to said third joint rotary member, said third joint base member being mechanically connected to said second joint equatorial plane capture means.

33. The apparatus of claim 24 wherein said third joint first connection means also comprises a gear portion affixed to said second joint base member.

34. The apparatus of claim 26 wherein said universal joint is also connected through a second access opening in said first joint ball means to a motor means serving as said second joint first force imparting means.

35. The apparatus of claim 26 wherein said universal joint is comprised of a sphere having a pin therethrough rotatably connected to a first hollow spherical shell therearound which in turn has a pin connected to a second hollow spherical shell therearound, said second spherical hollow shell being connected to said rotatable screw means.

36. The apparatus of claim 27 wherein said first joint second connection means comprises an extension of said retaining pin extending outward from said first joint equatorial plane capture means have a first rotary joint at its extended end, said first rotary joint being also connected to said first joint second force imparting means.

37. The apparatus of claim 28 wherein said second joint first connecting means comprises a rotatable screw means mounted in said second joint base member and rotatably connected to said second joint first force imparting means.

38. The apparatus of claim 37 wherein said second joint first force imparting means is a motor means mounted outside said second joint base member.

39. The apparatus of claim 37 wherein said rotatable screw means extends through said second joint base member and through said first joint equatorial plane capture means, and also through a first access opening in said first joint ball means into said interior opening therein to connect with a universal joint contained within said interior opening of which said second joint first connection is further comprised.

* * * * *